US008588098B2

(12) United States Patent
Ito

(10) Patent No.: US 8,588,098 B2
(45) Date of Patent: Nov. 19, 2013

(54) TRANSMISSION APPARATUS, RECEPTION APPARATUS, COMMUNICATION SYSTEM, AND PROCESSING METHOD USED IN RECEPTION APPARATUS

(75) Inventor: Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/129,954

(22) PCT Filed: Nov. 25, 2009

(86) PCT No.: PCT/JP2009/069826
§ 371 (c)(1),
(2), (4) Date: May 18, 2011

(87) PCT Pub. No.: WO2010/061832
PCT Pub. Date: Jun. 3, 2010

(65) Prior Publication Data
US 2011/0222429 A1 Sep. 15, 2011

(30) Foreign Application Priority Data

Nov. 25, 2008 (JP) ................ P2008-300219

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl.
USPC ......................................... 370/252

(58) Field of Classification Search
USPC .................. 370/252, 491, 500, 503–520
See application file for complete search history.

(56) References Cited

U.S. PATENT DOCUMENTS 5,479,408 A * 12/1995 Will .............................. 370/313
5,638,375 A * 6/1997 Dettro et al. .................. 370/324
(Continued)

FOREIGN PATENT DOCUMENTS

EP 1519518 3/2005
JP 2005 110245 4/2005
(Continued)

OTHER PUBLICATIONS

Texas Instruments, Improved Non-Synchronized Random Access Structure for E-UTRA, 3GPP TSG RAN WG1 #48 R1-070715, May 16, 2007, pp. 1-3.

Primary Examiner — Mark Rinehart
Assistant Examiner — Kenneth P Hunt
(74) Attorney, Agent, or Firm — Sony Corporation

(57) ABSTRACT

The present invention relates to a transmission apparatus, a reception apparatus, a communication system, and a processing method used in the reception apparatus that are capable of reducing collisions of an Ack frame.
A transmission apparatus 100 transmits an Ack frame 200 made up of only a PLCP preamble. In a reception apparatus 300, an RF unit 320 supplies the Ack frame 200 received by an antenna 310 to a PMD unit 340. The PMD unit 340 determines a termination end of the Ack frame 200 on the basis of a signal strength of the Ack frame 200 supplied from the RF unit 320. Furthermore, the PMD unit 340 generates a timing of the termination end of the PLCP preamble of the Ack frame 200 on the basis of the PLCP preamble. A PLCP unit 350 detects the Ack frame 200 on the basis of a result in which the termination end of the Ack frame 200 has been determined using the signal strength and the timing of the termination end of the PLCP preamble generated by the PLCP preamble of the Ack frame 200.

20 Claims, 16 Drawing Sheets

(56) References Cited

U.S. PATENT DOCUMENTS

| | | | |
|---|---|---|---|
| 5,881,102 A * | 3/1999 | Samson | 375/222 |
| 6,389,034 B1 * | 5/2002 | Guo et al. | 370/441 |
| 8,295,196 B2 * | 10/2012 | Ergen et al. | 370/252 |
| 2004/0127161 A1 * | 7/2004 | Leizerovich et al. | 455/67.11 |
| 2004/0151146 A1 * | 8/2004 | Hammerschmidt | 370/338 |
| 2005/0068979 A1 | 3/2005 | Boer et al. | |
| 2005/0152314 A1 * | 7/2005 | Sun et al. | 370/334 |
| 2010/0159970 A1 * | 6/2010 | Hagerman et al. | 455/500 |
| 2011/0222429 A1 * | 9/2011 | Ito | 370/252 |

FOREIGN PATENT DOCUMENTS

| | | |
|---|---|---|
| JP | 2006-197173 | 7/2006 |
| JP | 2006-217491 | 8/2006 |
| JP | 2008 160237 | 7/2008 |

* cited by examiner

TRANSMISSION APPARATUS, RECEPTION APPARATUS, COMMUNICATION SYSTEM, AND PROCESSING METHOD USED IN RECEPTION APPARATUS

TECHNICAL FIELD

The present invention relates to a transmission apparatus, a reception apparatus, and a communication system, and particularly relates to a transmission apparatus, a reception apparatus, a communication system, and a processing method used in the reception apparatus that are for performing confirmation of arrival using an acknowledgement frame.

BACKGROUND ART

Wireless communication systems for performing data communication between terminals using high-frequency signals are widely used. In such a wireless communication system, if a frame transmitted from a transmission terminal collides with another frame or if the signal strength of the frame is low, the frame from the source may not reach a destination. Therefore, in the transmission terminal in the wireless communication system, an acknowledgement (Ack) method is generally used in which proper arrival of transmitted data in the destination is confirmed by receiving an Ack frame from the destination.

In such an acknowledgement method, a source performs a retransmission process of retransmitting the same data as transmitted data if the source cannot receive an Ack frame from the destination within a certain time period. If the source cannot receive an Ack frame even after the source has performed such a retransmission process a certain number of times, the source changes a frame modulation scheme to a modulation scheme that is more resistant to interference and further repeatedly performs the retransmission process.

The change to a modulation scheme resistant to interference causes an increase in frame length. Thus, in a network with traffic congestion, a collision rate between frames increases, which may further increase the traffic. For the purpose of suppressing the increase in traffic caused by such a change of the modulation scheme, there has been suggested a method for determining whether or not the cause of not being able to receive an Ack frame is collision. For example, there has been suggested an apparatus for detecting the energy level of a reception signal in a period when the reception of an Ack message is expected (for example, see PTL 1).

CITATION LIST

Patent Literature

PTL 1: Japanese Unexamined Patent Application Publication No. 2005-110245 (FIG. 4)

SUMMARY OF INVENTION

Technical Problem

In the above-described related art, the cause of not being able to receive an Ack message is determined to be collision if the Ack message cannot be received within a period when the reception of the Ack message is expected and if the energy level of a reception signal increases. Accordingly, the necessity/non-necessity for changing a modulation scheme can be controlled, and thus an increase in traffic caused by an increase in frame length can be suppressed to some extent.

However, since the occurrence of collisions of an Ack frame itself cannot be reduced, an increase in traffic due to a retransmission process occurs.

The present invention has been made in view of such circumstances, and is directed to reducing the occurrence of collisions of an Ack frame.

Solution to Problem

The present invention has been made in order to solve the above-described problem, and a first aspect thereof is a transmission apparatus including: a preamble generating unit that generates only a preamble for adjusting carrier frequency error of a high-frequency signal, the preamble serving as an acknowledgement frame for confirmation of reception; and a transmitting unit that transmits the acknowledgement frame generated by the preamble generating unit as the high-frequency signal. This brings an operation of transmitting the acknowledgement frame made up of only the preamble.

Also, a second aspect of the present invention is a reception apparatus including: a receiving unit that receives a packet signal including a preamble; a signal strength determining unit that determines a termination end of the packet signal on the basis of a strength of the signal received by the receiving unit; a timing generating unit that generates a timing of a termination end of the preamble by detecting the preamble; and an acknowledgement frame detecting unit that detects that the packet signal is an acknowledgement frame made up of only the preamble on the basis of a result in which the termination end of the packet signal has been determined by the signal strength determining unit and the timing of the termination end of the preamble generated by the timing generating unit, and a processing method therefor. This brings an operation of detecting the acknowledgement frame made up of only the preamble.

Also, in the second aspect, the acknowledgement frame detecting unit may detect that the packet signal is the acknowledgement frame on the basis of an estimated period and the result in which the termination end of the packet signal has been determined, the estimated period being a period in which the signal strength determining unit determines a termination end of the acknowledgement frame and which is estimated on the basis of the timing of the termination end of the preamble. This brings an operation of estimating the period in which the signal strength determining unit determines the termination end of the acknowledgement frame on the basis of the timing of the termination end of the preamble generated by the timing generating unit, and detecting the acknowledgement frame on the basis of the estimated period and the result of determination made by the signal strength determining unit.

Also, in the second aspect, the reception apparatus may further include a decoding unit that decodes the packet signal received by the receiving unit, and an acknowledgement data detecting unit that detects that data decoded by the decoding unit is data representing an acknowledgement. This brings an operation of decoding the received packet signal and detecting that the decoded data is data representing the acknowledgement frame.

Also, in the second aspect, the signal strength determining unit may determine the termination end of the packet signal on the basis of the strength of the signal received by the receiving unit and a certain threshold. This brings an operation of determining the termination end of the packet signal on the basis of the strength of the signal received by the receiving unit and the certain threshold. In this case, the signal strength determining unit may determine the termination end of the packet signal on the basis of an amount of change in the strength of the signal received by the receiving unit. This brings an operation of determining the termination end of the packet signal on the basis of the amount of change in signal strength.

Also, in the case of determining the termination end of the packet signal on the basis of the strength of the signal received by the receiving unit and the certain threshold, the signal strength determining unit may set the threshold on the basis of a strength of the signal before the packet signal is received by the receiving unit. This brings an operation of setting the threshold with reference to the signal strength before reception.

Also, a third aspect of the present invention is a communication system including: a transmission apparatus that transmits an acknowledgement frame made up of only a preamble; and a reception apparatus that includes a receiving unit that receives the acknowledgement frame as a packet signal transmitted from the transmission apparatus, a signal strength determining unit that determines a termination end of the packet signal on the basis of a strength of the signal received by the receiving unit, a timing generating unit that generates a timing of a termination end of the preamble by detecting the preamble, and an acknowledgement frame detecting unit that detects that the packet signal is the acknowledgement frame on the basis of a result in which the termination end of the packet signal has been determined by the signal strength determining unit and the timing of the termination end of the preamble generated by the timing generating unit. This brings an operation of transmitting the acknowledgement frame made up of only the preamble by the transmission apparatus, and detecting that the received packet signal is the acknowledgement frame by the reception apparatus.

Advantageous Effects of Invention

According to the present invention, an excellent effect of being able to reduce collisions of an Ack frame can be obtained.

DESCRIPTION OF EMBODIMENTS

Hereinafter, the best modes for carrying out the present invention (hereinafter referred to as embodiments) will be described. The description will be given in the following order.

1. First embodiment (wireless communication system: an example of transmitting/receiving an Ack frame)
2. Second embodiment (wireless communication system: an example of using a conventional Ack frame in combination)

1. First Embodiment

[Example Configuration of Wireless Communication System]

Figure 1:
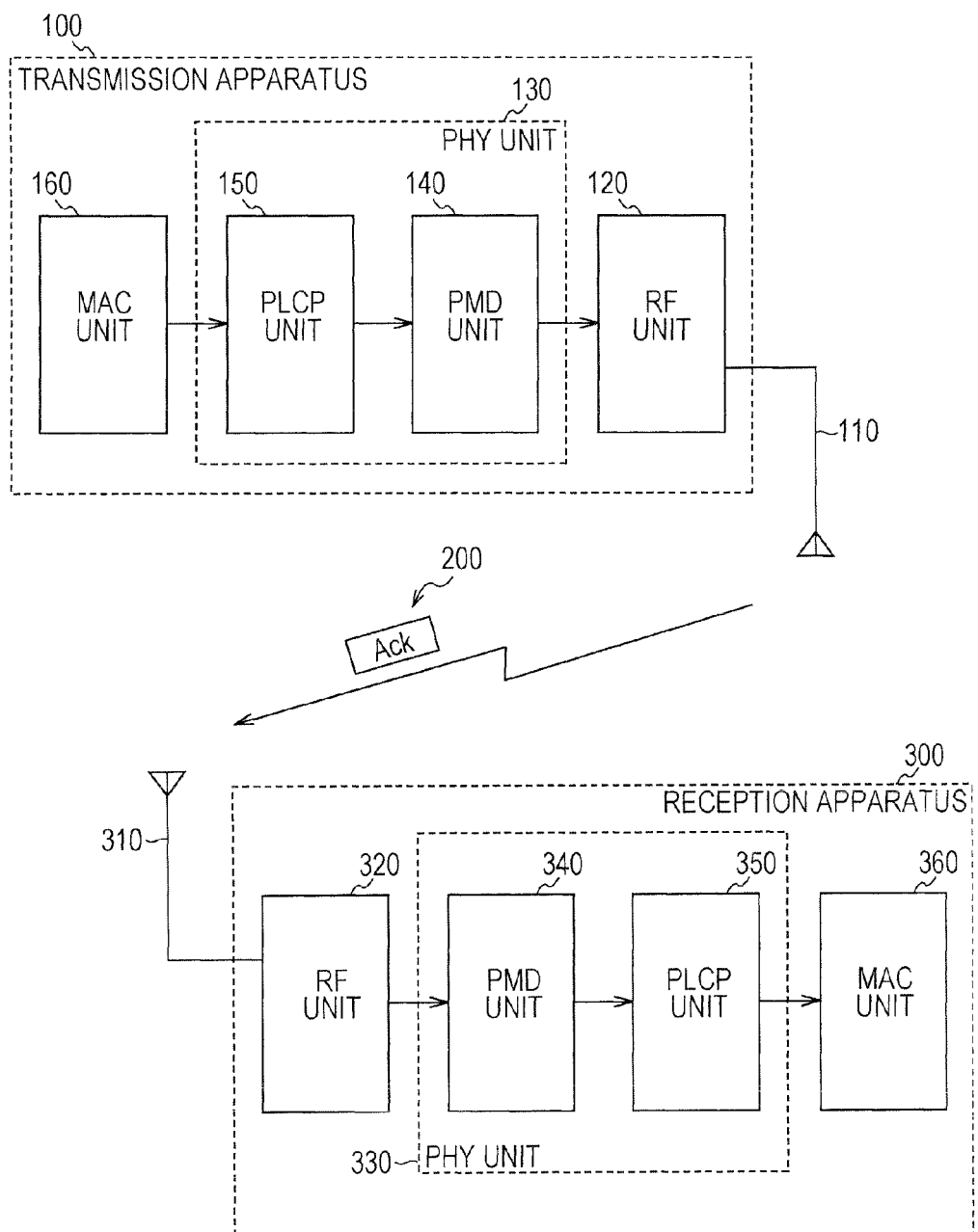
FIG. 1 is a block diagram illustrating an example configuration of a wireless communication system according to a first embodiment of the present invention.

FIG. 1 is a block diagram illustrating an example configuration of a wireless communication system according to a first embodiment of the present invention. This wireless communication system includes a transmission apparatus 100 that receives data from a reception apparatus 300 and transmits an Ack frame 200 as an acknowledgement of reception of the data, and the reception apparatus 300 that receives the transmitted Ack frame 200. The transmission apparatus 100 and the reception apparatus 300 have equivalent functional configurations as wireless communication apparatuses, but the names of the apparatuses are given here from the viewpoint of transmission/reception of the Ack frame 200.

The transmission apparatus 100 includes an antenna 110, an RF (Radio Frequency) unit 120, a PHY (Physical Layer) unit 130, and an MAC (Medium Access Control) unit 160. Note that the transmission apparatus 100 is an example of the transmission apparatus described in the claims.

The MAC unit 160 controls the PHY unit 130 in order to transmit the Ack frame 200 or a Data frame, which is a frame other than the Ack frame 200. For example, if data from the reception apparatus 300 has been normally received, the MAC unit 160 transmits, to the PHY unit 130, a transmission start request for transmitting the Ack frame 200 as an acknowledgement of reception of the data.

In response to the transmission start request from the MAC unit 160, the PHY unit 130 generates the Ack frame 200. The PHY unit 130 includes a PLCP (Physical Layer Convergence Protocol) unit 150 and a PMD (Physical Medium Dependent) unit 140. Note that the PHY unit 130 is an example of the preamble generating unit described in the claims.

The PLCP unit 150 determines whether or not the frame that should be transmitted is the Ack frame 200 on the basis of the transmission start request from the MAC unit 160. Then, if it is determined that the frame that should be transmitted is the Ack frame 200, the PLCP unit 150 generates a PLCP preamble for adjusting carrier frequency error of a high-frequency signal. Then, the PLCP unit 150 supplies a frame made up of only the PLCP preamble, the frame serving as the Ack frame 200, to the RF unit 120 via the PMD unit 140. Furthermore, the PLCP unit 150 transmits a transmission level request and a transmission start request of the Ack frame 200 to the PMD unit 140 in response to the transmission start request from the MAC unit 160.

Also, the PLCP unit 150 notifies the MAC unit 160 of the end of transmission after generating the Ack frame 200. In addition, if it is determined that the frame that should be transmitted is not the Ack frame 200, the PLCP unit 150 generates a Data frame on the basis of the data supplied from the MAC unit 160 and the PLCP preamble.

The PMD unit 140 sets the transmission level of the Ack frame 200 on the basis of a notification from the PLCP unit 150. For example, the PMD unit 140 amplifies the Ack frame 200 in accordance with the set transmission level. Also, the PMD unit 140 supplies the amplified Ack frame 200 to the RF unit 120.

The RF unit 120 converts the Ack frame 200 supplied from the PMD unit 140 into a high-frequency signal and supplies it to the antenna 110. The antenna 110 is used for transmitting a high-frequency signal, serving as a packet signal, generated through frequency conversion performed by the RF unit 120 to the reception apparatus 300. For example, the antenna 110 may transmit a high-frequency signal in a 2.4 GHz band or a 5.2 GHz band. Note that the antenna 110 and the RF unit 120 form an example of the transmitting unit described in the claims.

The reception apparatus 300 includes an antenna 310, an RF unit 320, a PHY unit 330, and an MAC unit 360. Note that the reception apparatus 300 is an example of the reception apparatus described in the claims.

The antenna 310 receives a packet signal, which is a transmitted high-frequency signal. For example, the antenna 310 may receive a packet signal in a 2.4 GHz band or a 5.2 GHz band.

The RF unit 320 performs frequency conversion on the packet signal received by the antenna 310. The RF unit 320 supplies the frequency-converted packet signal, serving as a frame, to the PHY unit 330. Furthermore, the RF unit 320 supplies the signal strength of the packet signal received by the antenna 310 to the PHY unit 330. Note that the antenna 310 and the RF unit 320 form an example of the receiving unit described in the claims.

The PHY unit 330 detects the Ack frame 200 among the frames supplied from the RF unit 320. The PHY unit 330 includes a PMD unit 340 and a PLCP unit 350. The PMD unit 340 determines the start of reception of the packet signal and the end of reception of the packet signal on the basis of the signal strength supplied from the RF unit 320. That is, the PMD unit 340 determines the start end and termination end of the packet signal on the basis of the signal strength supplied from the RF unit 320. Also, the PMD unit 340 detects a PLCP preamble included in the packet signal, thereby generating the timing of the termination end of the PLCP preamble. Also, the PMD unit 340 notifies the PLCP unit 350 of the determination result of the start end and termination end of the packet signal and the timing of the termination end of the preamble.

The PLCP unit 350 detects that a received packet signal is the Ack frame 200 on the basis of the determination result of the termination end of the packet signal and the timing of the termination end of the preamble that are notified from the PMD unit 340. The PLCP unit 350 notifies the MAC unit 360 that the Ack frame 200 has been detected.

Also, the PLCP unit 350 notifies the MAC unit 360 of the determination result of the start end and termination end of the packet signal from the PMD unit 340. Also, the PLCP unit 350 decodes a Data frame, which is a frame other than the Ack frame 200, and supplies the decoded Data frame, serving as reception data, to the MAC unit 360.

The MAC unit 360 performs a process on the reception data on the basis of a notification from the PLCP unit 350. When receiving a notification that the Ack frame 200 has been detected, the MAC unit 360 determines that the data transmitted to the transmission apparatus 100 has been normally received, and performs a process of transmitting next data. Also, the MAC unit 360 performs a process on the reception data supplied from the PLCP unit 350 on the basis of address information, identification information, and the like included in the reception data.

Next, the frame configuration of the Data frame and the Ack frame 200 generated by the PHY unit 130 will be described with reference to the drawings.

[Example Configuration of Data Frame in Wireless Communication System]

Figure 2:
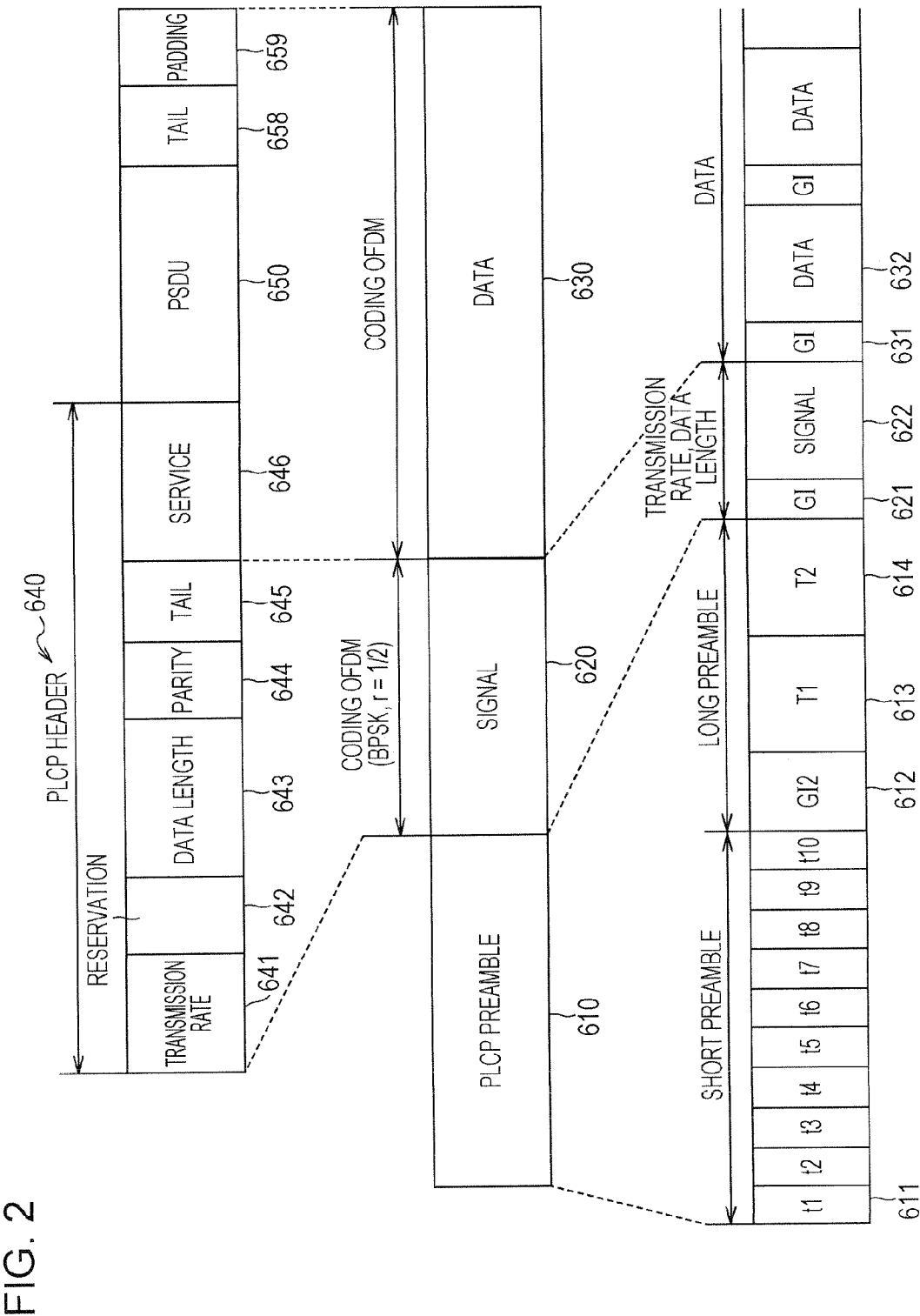
FIG. 2 is a diagram illustrating a configuration of a Data frame.

FIG. 2 is a diagram illustrating a configuration of a Data frame. Here, a frame configuration based on the IEEE802.11a standard is illustrated as an example. The IEEE802.11a standard is a standard defined by a working group of the 802 standardization committee of IEEE (Institute of Electrical and Electronic Engineers).

The frame based on the IEEE802.11a standard is made up of a PLCP preamble 610, a signal 620, and data 630. The PLCP preamble 610 is a default fixed pattern signal for a reception synchronization process of a wireless packet signal. The signal 620 is an OFDM symbol including the transmission rate and data length of the data 630. The data 630 is a field including the main body of information data.

When attention is focused on a logical field, the signal 620 is made up of a transmission rate 641 of four bits, a reservation bit 642 of one bit, a data length 643 of twelve bits, a parity 644 of one bit, and a tail 645 of six bits that terminates the convolution coding. Both the transmission rate 641 and the data length 643 relate to the data 630. The signal 620 itself is transmitted at the most reliable transmission rate of 6 Mbps, that is, using BPSK (Binary Phase Shift Keying) modulation with a coding rate of 1/2.

The data 630 is made up of a service 646 of sixteen bits and variable-length data PSDU (PLCP Service Data Unit) 650. Furthermore, the data 630 is made up of a tail 658 of six bits that terminates the convolution coding and a padding bit 659 for padding extra bits of the OFDM symbol. The data PSDU 650 stores information about a frame control field, an address field, a frame body field, and the like in a MAC frame. Also, the service 646 is made up of "0" of seven bits for giving an initial state of a scrambler and reservation bits of nine bits. Also, the individual fields of the signal 620 and the service 646 form a PLCP header 640.

When attention is focused on a physical signal in the frame, the PLCP preamble 610 is made up of a short preamble that includes ten short training symbols 611 and a long preamble that includes two long training symbols 613 and 614. The short preamble is a default fixed pattern signal of 0.8 μs periods with a 12-wave subcarrier, and serves as a signal of 8.0 μs in total with the ten short training symbols t1 to t10. This short preamble is used for detection of a packet signal, signal amplification, rough adjustment of carrier frequency error, detection of symbol timing, or the like in the PMD unit 340.

On the other hand, the long preamble is a 2-symbol repetition signal with a 52-wave subcarrier, and serves as a signal of 8.0 μs in total with the two long training symbols 613 and 614 of 3.2 μs that follow a guard interval 612 of 1.6 μs. This long preamble is used for fine adjustment of carrier frequency error and channel estimation in the PMD unit 340, that is, for detection of a reference amplitude and a reference phase of each subcarrier.

In the signal 620, a guard interval 621 of 0.8 μs is added before the main body of a signal 622 of 3.2 μs, thereby forming a signal of 4 μs in total. Also, regarding the data 630, a signal of 4 μs in total, in which a guard interval 631 of 0.8 μs is added before the main body of data 632 of 3.2 μs, is repeated in accordance with the data length 643.

Note that an Ack frame based on the IEEE802.11a standard has a configuration similar to that of the Data frame, and information about an acknowledgement is stored in the PSDU 650. Here, the Ack frame based on the IEEE802.11a standard is called a conventional Ack frame.

[Example Configuration of Ack Frame in Wireless Communication System]

Figure 3:
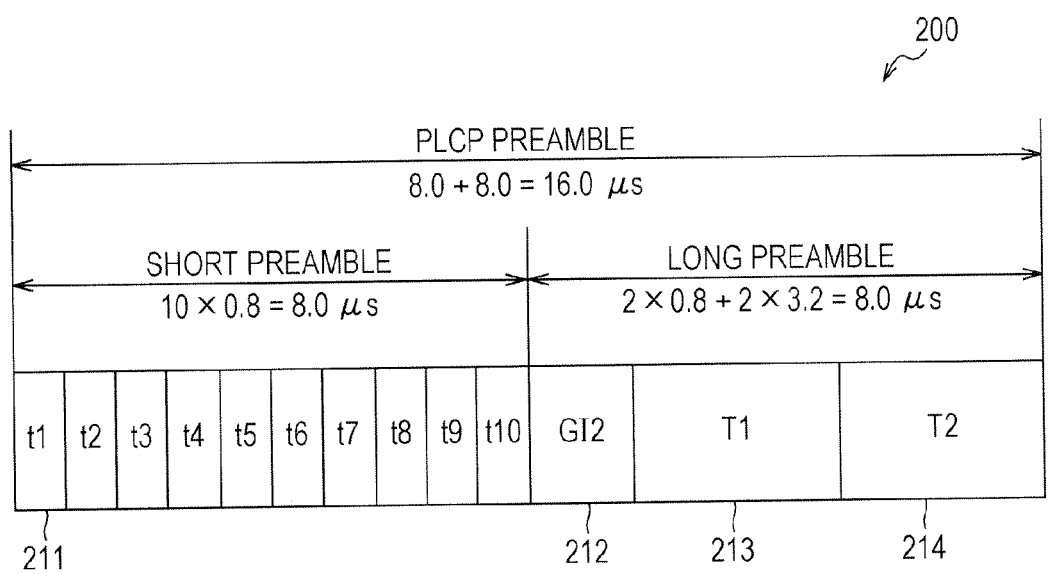
FIG. 3 is a diagram illustrating an example configuration of an Ack frame 200 according to the first embodiment of the present invention.

FIG. 3 is a diagram illustrating an example configuration of the Ack frame 200 according to the first embodiment of the present invention. Here, the Ack frame 200 made up of only the PLCP preamble 610 illustrated in FIG. 2 is illustrated.

The Ack frame 200 is an Ack frame made up of only the PLCP preamble 610 illustrated in FIG. 2. As described above with reference to FIG. 2, the Ack frame 200 serves as a signal of 16.0 μs in total including a short preamble of 8.0 μs and a long preamble of 8.0 μs. Here, short training symbols 211, a guard interval 212, and long training symbols 213 and 214 are similar to those illustrated in FIG. 1, and thus the description thereof is omitted.

As described above, the Ack frame 200 has a shorter frame length than the conventional Ack frame, and thus collision between the Ack frame 200 and another frame caused by a hidden terminal problem illustrated in the next figure can be avoided.

[Example of Hidden Terminal Problem]

Figure 4:
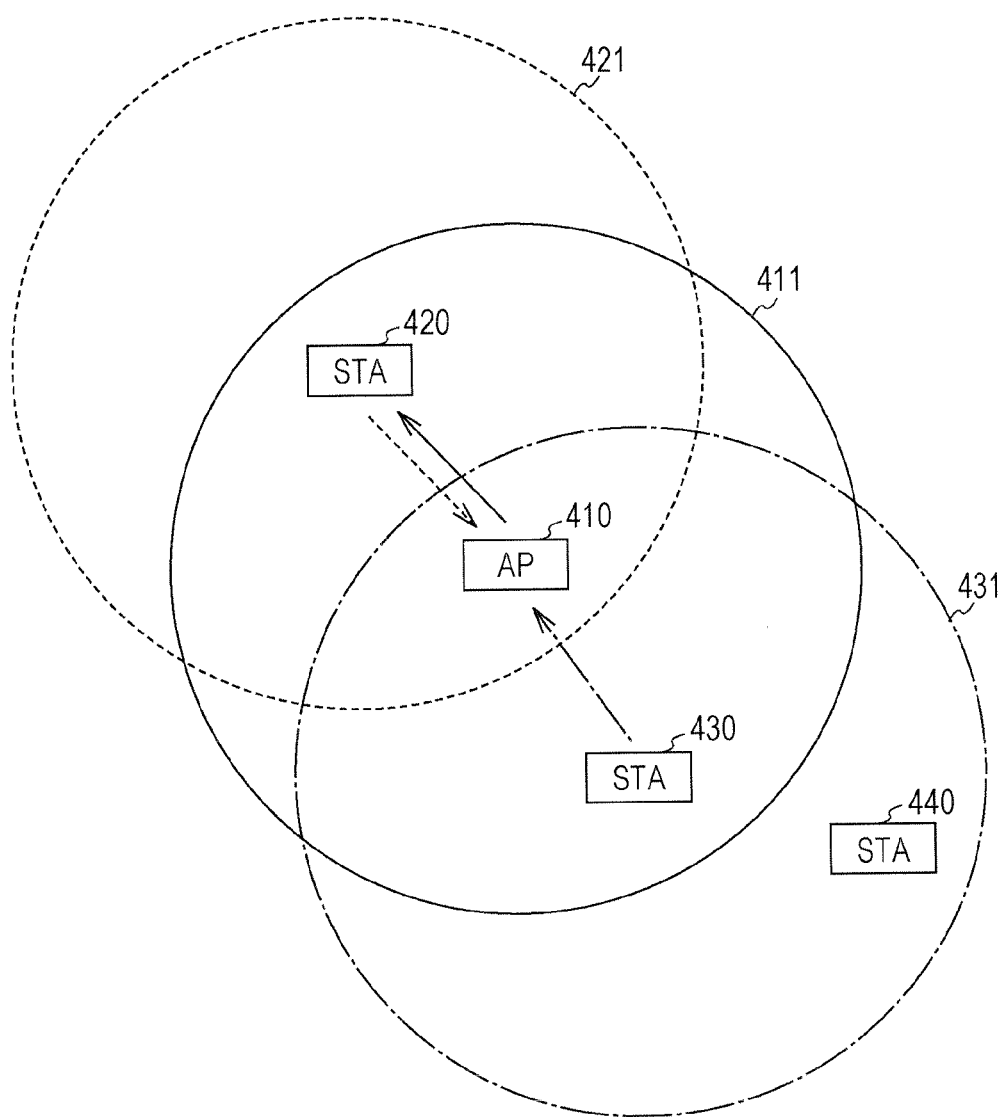
FIG. 4 is a conceptual diagram illustrating an example of a hidden terminal problem in a conventional wireless communication system.

FIG. 4 is a conceptual diagram illustrating an example of a hidden terminal problem in a conventional wireless communication system. FIG. 4 illustrates a wireless base station (AP) 410, wireless terminals (STAs) 420 to 440, and communication regions 411 to 431.

The wireless base station (AP) 410 performs communication with the wireless terminals (STAs) 420 to 440 positioned within the communication region 411. The wireless terminal (STA) 420 performs communication with the wireless base station (AP) 410 positioned within the communication region 421. The wireless terminal (STA) 430 performs communication with the wireless base station (AP) 410 positioned within the communication region 431.

In this configuration, when the wireless terminal (STA) 420 normally receives a Data frame from the wireless base station (AP) 410 in the communication performed with the wireless base station (AP) 410, the wireless terminal (STA) 420 transmits an Ack frame indicated by a broken line to the wireless base station (AP) 410.

At this time, the wireless terminal (STA) 430 cannot detect the Ack frame transmitted by the wireless terminal (STA) 420 because the wireless terminal (STA) 430 is positioned outside the communication region 421. Thus, the wireless terminal (STA) 430 may transmit a Data frame indicated by a chain line to the wireless base station (AP) 410. Also, although not illustrated here, it is estimated that the wireless terminal (STA) 430 may transmit a Data frame to the wireless terminal (STA) 440.

In this way, since a frame outside a communication region cannot be detected, the Ack frame from the wireless terminal (STA) 420 and the Data frame from the wireless terminal (STA) 430 collide with each other. Such a problem is called a hidden terminal problem. Now, regarding such a hidden terminal problem, an example of a communication procedure in the case of using the Ack frame 200 according to the first embodiment of the present invention will be described with reference to the drawings.

[Comparison with Conventional Ack Frame]

Figure 5:
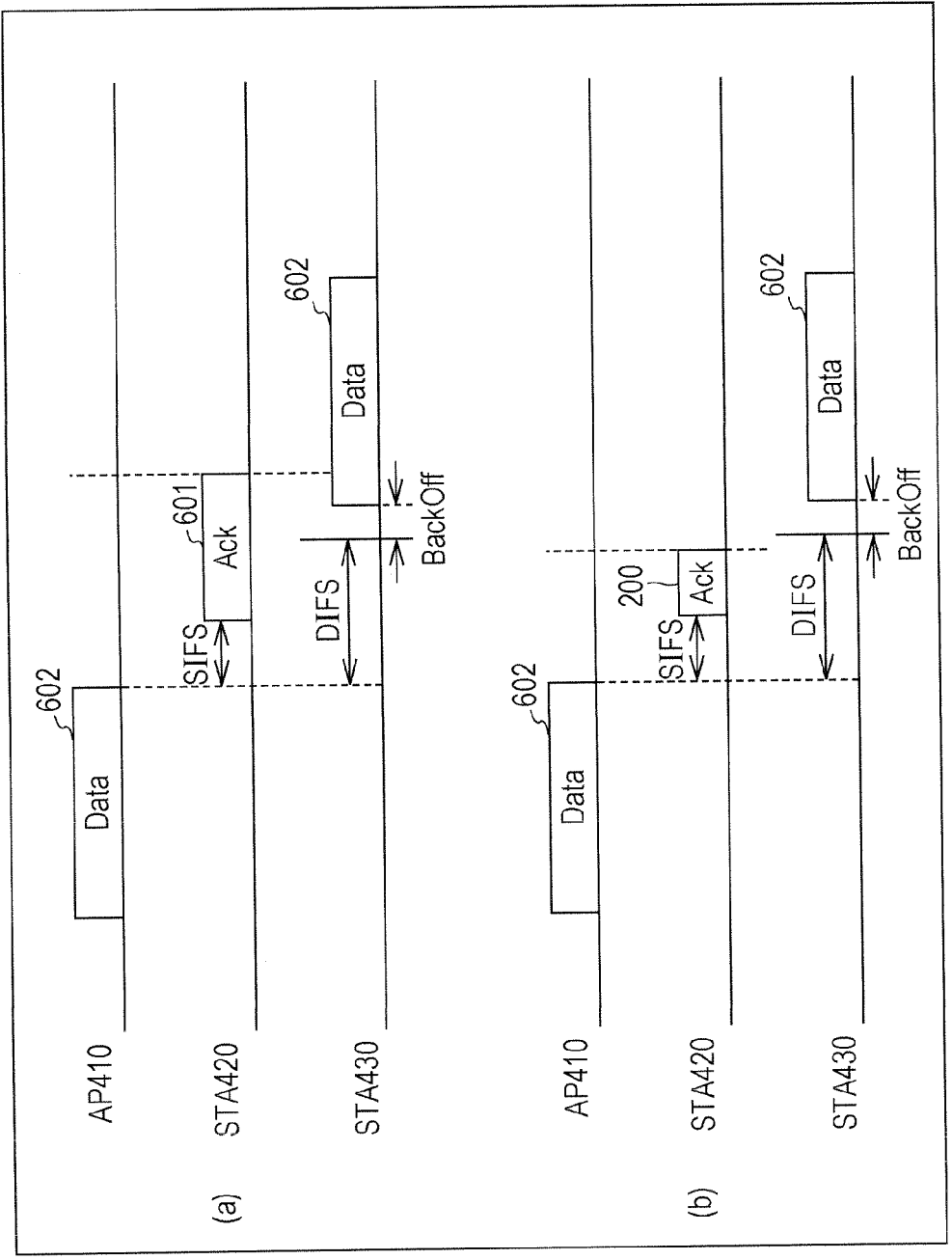
FIG. 5 is a conceptual diagram illustrating transmission timings of frames in the wireless communication system illustrated in FIG. 4.

FIG. 5 is a conceptual diagram illustrating transmission timings of frames in the wireless communication system illustrated in FIG. 4. Here, it is assumed that transmission is performed on the basis of parameters according to the IEEE802.11a standard. Each of parts (a) and (b) of FIG. 5 illustrates the frames transmitted from the wireless base station (AP) 410, the wireless terminal (STA) 420, and the wireless terminal (STA) 430 in order from the top, with the horizontal axis being a time axis.

Part (a) of FIG. 5 is a diagram in a case where a conventional Ack frame 601 is transmitted from the wireless terminal (STA) 420 to the wireless base station (AP) 410. First, the wireless base station (AP) 410 transmits a Data frame 602 to the wireless terminal (STA) 420. Then, the wireless terminal (STA) 420 normally receives the Data frame 601 from the wireless base station (AP) 410, and then transmits the Ack frame 601 after waiting SIFS (short frame interval). At this time, the wireless terminal (STA) 430 cannot detect the Ack frame 601 transmitted from the wireless terminal (STA) 420. Thus, the wireless terminal (STA) 430 transmits a Data frame 602 after waiting a BackOff time in addition to DIFS (distribution control frame interval) from the end of transmission of the Data frame 601 by the wireless base station (AP) 410.

Note that SIFS here means a certain waiting time in the case of transmitting an Ack frame. Also, DIFS means a certain waiting time in the case of transmitting the Data frame 602. SIFS and DIFS are defined to be 16 μs and 34 μs, respectively, according to the IEEE802.11a standard. Also, the BackOff time is a multiple of a certain time and is a waiting time that is set using a random-number value. These are waiting times that are set for avoiding collision of frames.

As described above, in the wireless communication system illustrated in FIG. 4, part of the Ack frame 601 transmitted from the wireless terminal (STA) 420 and part of the Data frame 602 transmitted from the wireless terminal (STA) 430 may collide with each other.

Part (b) of FIG. 5 is a diagram in a case where the Ack frame 200 according to the first embodiment of the present invention is transmitted from the wireless terminal (STA) 420 to the wireless base station (AP) 410. In this case, the period of SIFS (16 μs) and the frame period (16 μs) of the Ack frame 200 total 32 μs. This is within the period of DIFS (34 μs) in the wireless terminal (STA) 430, and thus the Ack frame 200 does not collide with the Data frame 602 transmitted from the wireless terminal (STA) 430.

In this way, with the use of the Ack frame 200, the collision of the Ack frame 200 itself in the hidden terminal problem illustrated in FIG. 4 can be avoided.

Also, with the use of the Ack frame 200, the usage efficiency of communication lines can be increased as illustrated in the next figure.

Figure 6:
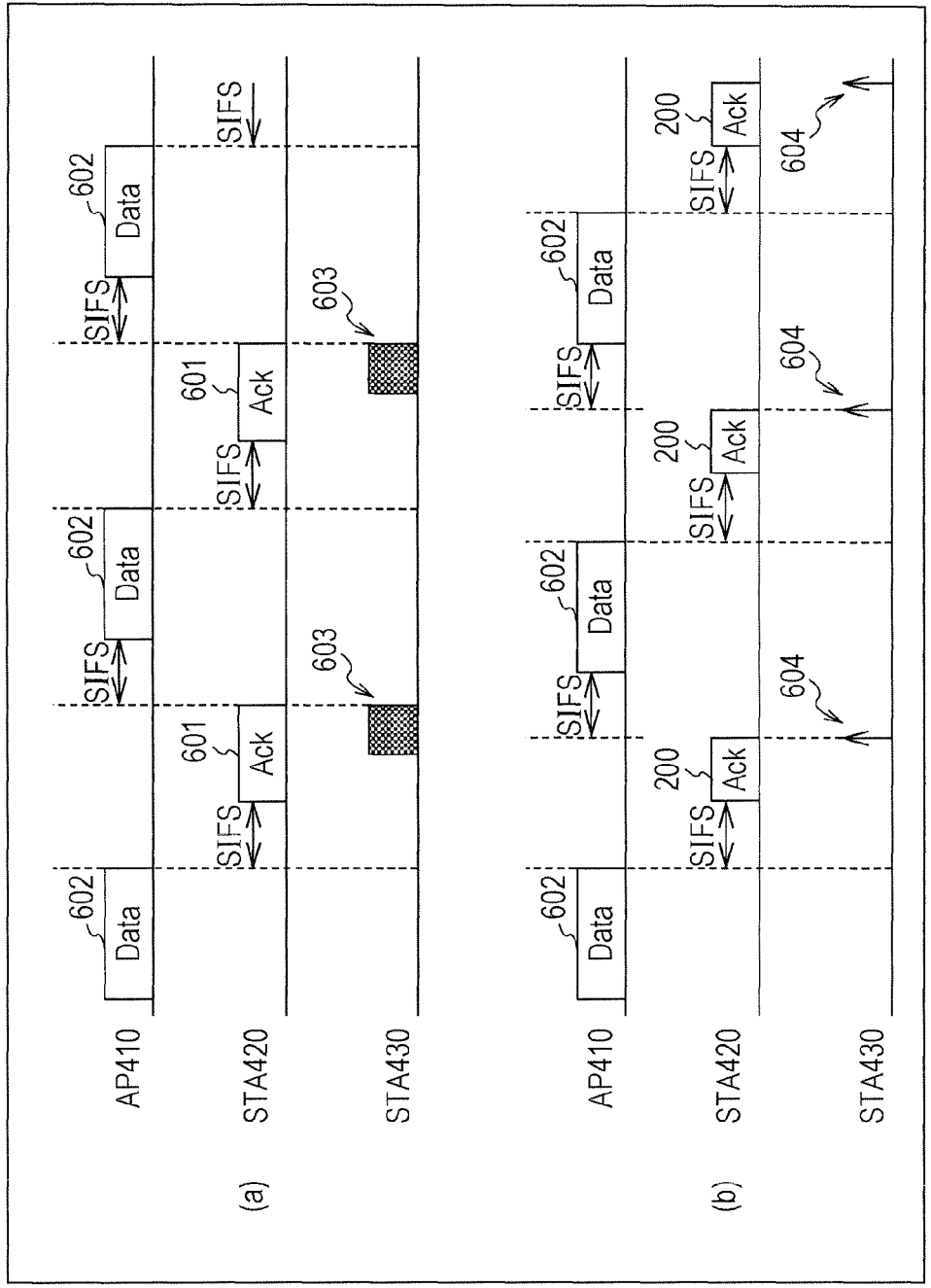
FIG. 6 is a conceptual diagram illustrating the usage efficiency of communication lines in the wireless communication system illustrated in FIG. 4.

FIG. 6 is a conceptual diagram illustrating the usage efficiency of communication lines in the wireless communication system illustrated in FIG. 4. Each of parts (a) and (b) of FIG. 6 illustrates the frames transmitted from the wireless base station (AP) 410 and the wireless terminal (STA) 420, with the horizontal axis being a time axis. Here, repetition of a procedure in which the wireless base station (AP) 410 transmits a Data frame 602 to the wireless terminal (STA) 420, and the wireless terminal (STA) 420 that has received the Data frame 602 transmits an Ack frame to the wireless base station (AP) 410 is illustrated.

Part (a) of FIG. 6 is a diagram in a case where the conventional Ack frame 601 is transmitted from the wireless terminal (STA) 420 to the wireless base station (AP) 410. Note that the wireless terminal (STA) 430 identifies the destination of the received conventional Ack frame 601 and then discards received data 603.

Part (b) of FIG. 6 is a diagram in a case where the Ack frame 200 according to the first embodiment of the present invention is transmitted from the wireless terminal (STA) 420 to the wireless base station (AP) 410. Note that, in the wireless terminal (STA) 430, reception synchronization 604 is established upon reception of the Ack frame 200, but the end of reception of a packet signal is detected at almost the same timing, and thus the status soon changes to a waiting status.

In this way, with the use of the Ack frame 200, the frame length of the Ack frame decreases, and thus the throughput of communication lines in the wireless communication system can be improved. Next, the operation of the transmission apparatus 100 for transmitting the Ack frame 200 will be described with reference to the next figure.

[Example Operation of Transmission Apparatus]

Figure 7:
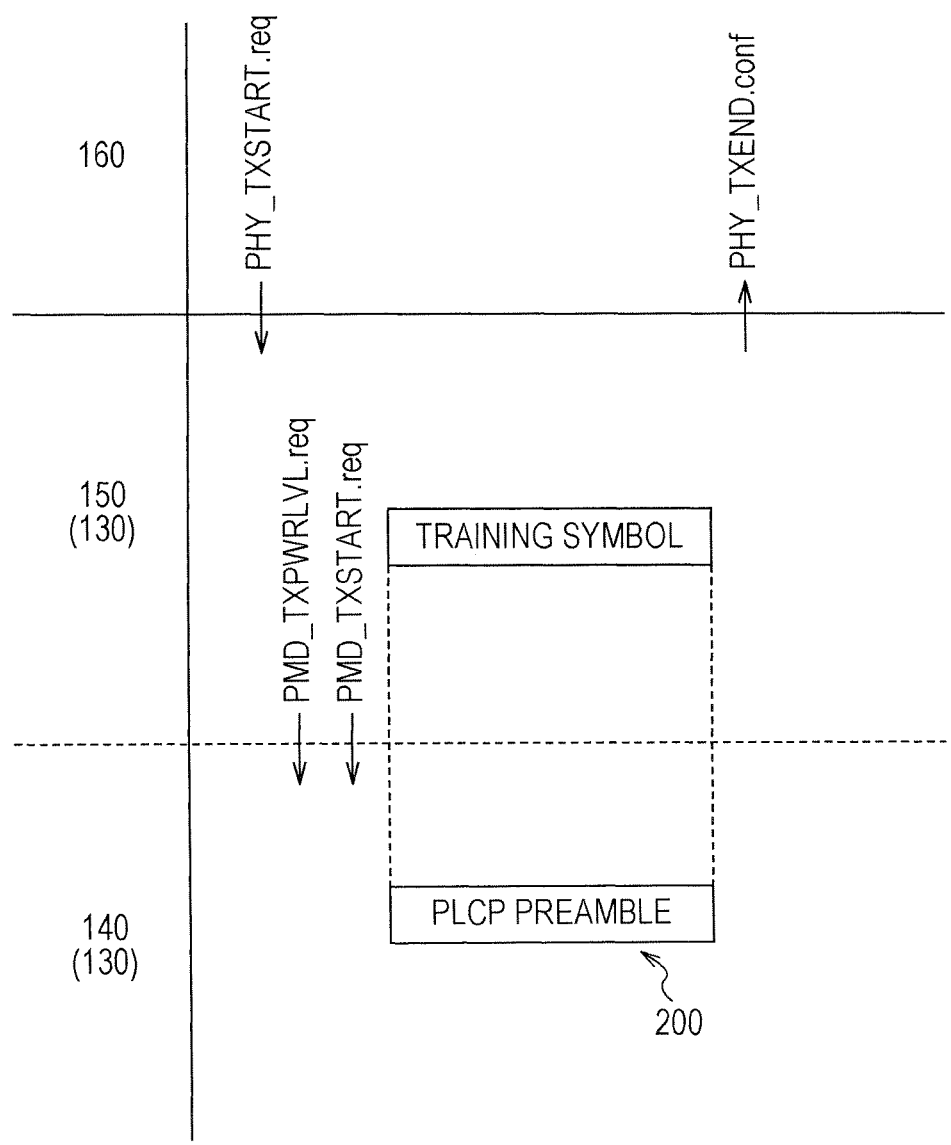
FIG. 7 is a diagram illustrating an example of a procedure of transmitting the Ack frame 200 in a transmission apparatus 100 according to the first embodiment of the present invention.

FIG. 7 is a diagram illustrating an example of a procedure of transmitting the Ack frame 200 in the transmission apparatus 100 according to the first embodiment of the present invention.

The MAC unit 160 issues a transmission start request (PHY_TXSTART.req) for transmitting the Ack frame 200 to the PLCP unit 150. This transmission start request (PHY_TXSTART.req) includes information for determining whether or not the frame that should be transmitted is the Ack frame 200. For example, a predefined value may be set to LENGTH information included in the transmission start request, and an Ack transmission request (PMD_Ack.req) for frame determination may be newly set to the transmission start request.

Subsequently, the PLCP unit 150 issues a transmission level request (PMD_TXPWRLVL.req) and a transmission start request (PMD_TXSTART.req) to the PMD unit 140 on the basis of the transmission start request (PHY_TXSTART.req) from the MAC unit 160. Accordingly, the PMD unit 140 performs certain processes necessary for transmission, such as setting of the transmission level of the Ack frame 200 and others. Then, the PLCP unit 150 generates a training symbol, and after generating the training symbol, issues a transmission end confirmation (PHY_TXEND.conf) to the MAC unit 160.

Figure 8:
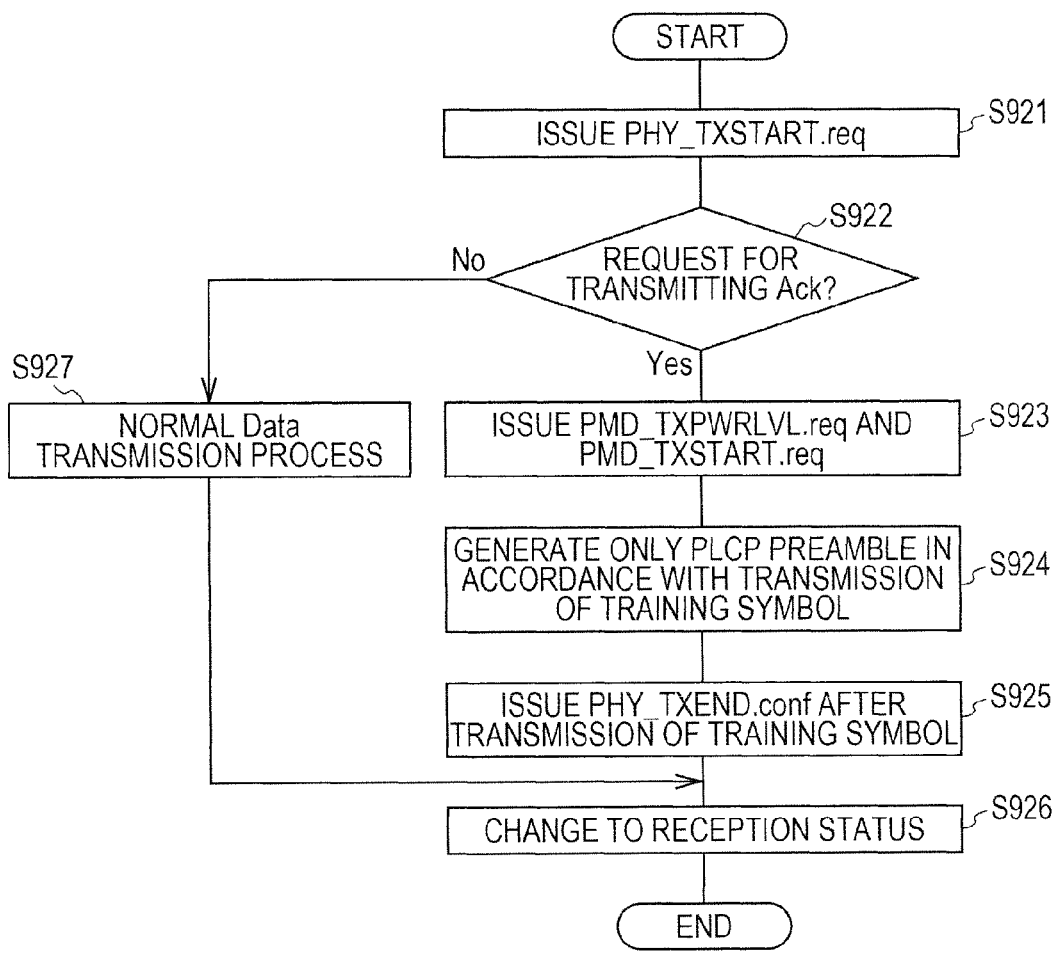
FIG. 8 is a flowchart illustrating an example procedure of a process of transmitting the Ack frame 200 in the transmission apparatus 100 according to the first embodiment of the present invention.

FIG. 8 is a flowchart illustrating an example procedure of a process of transmitting the Ack frame 200 in the transmission apparatus 100 according to the first embodiment of the present invention.

First, the MAC unit 160 issues a transmission start request (PHY_TXSTART.req) (step S911). Subsequently, the PLCP unit 150 determines whether or not the frame that should be transmitted is the Ack frame 200 on the basis of the transmission start request (PHY_TXSTART.req) (step S912). Then, if it is determined that the frame that should be transmitted is a Data frame, which is a frame other than the Ack frame 200, a normal process of transmitting a Data frame is executed (step S917).

On the other hand, if it is determined that the frame that should be transmitted is the Ack frame 200, the PLCP unit 150 issues a transmission level request (PMD_TXPWLVL.req) and a transmission start request (PMD_TXSTART.req) (step S913). Subsequently, the PLCP unit 150 generates a training symbol (step S914). Then, after the training symbol has been generated, a transmission end confirmation (PHY_TXEND.conf) is issued to the MAC unit 160 (step S915). Accordingly, the communication status in the MAC unit 160 changes to a reception status (step S916).

In this way, the transmission end confirmation (PHY_TXEND.conf) is issued after the training symbol has been generated, so that the Ack frame 200 made up of only a PLCP preamble is generated. Next, the operation of the reception apparatus 300 that receives the Ack frame 200 will be described with reference to the drawings.

[Example Operation of Reception Apparatus]

Figure 9:
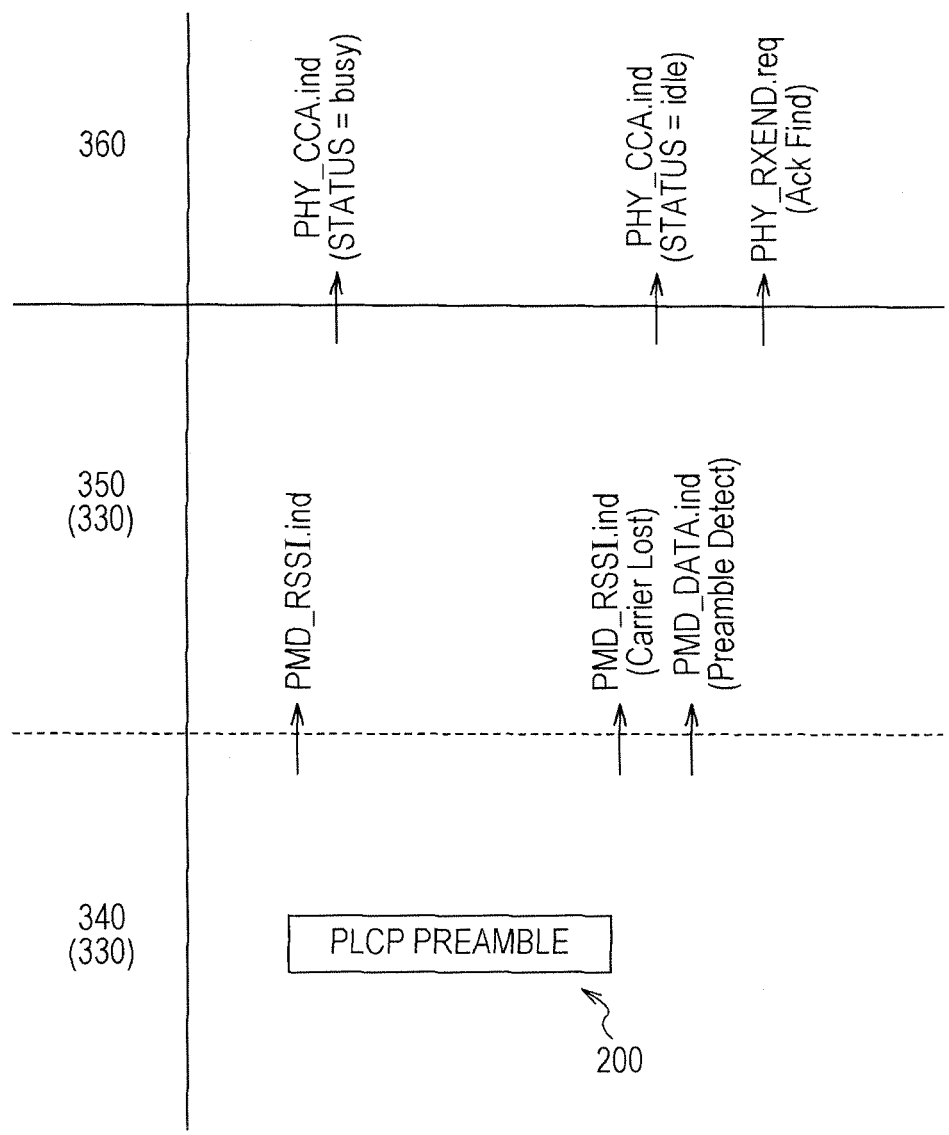
FIG. 9 is a diagram illustrating an example of a procedure of receiving the Ack frame 200 in a reception apparatus 300 according to the first embodiment of the present invention.

FIG. 9 is a diagram illustrating an example of a procedure of receiving the Ack frame 200 in the reception apparatus 300 according to the first embodiment of the present invention.

After the Ack frame 200 made up of only a PLCP preamble has been received, the PMD unit 340 issues a packet signal reception start notification (PMD_RSSI.ind) to the PLCP unit 350. Then, the PLCP unit 350 issues a reception start notification (PHY_CCA.ind (STATUS=busy)) to the MAC unit 360. Accordingly, the MAC unit 360 changes to a busy status.

Subsequently, when the signal strength of a packet signal becomes equal to or lower than a certain threshold, the PDM unit 340 issues a packet signal reception end notification (PMD_RSSI.ind (Carrier Lost)) to the PLCP unit 350. Then, the PLCP unit 350 issues a reception end notification (PRY_CCA.ind (STATUS=idle)) to the MAC unit 360. Accordingly, the MAC unit 360 changes to a waiting status. Then, the PMD unit 340 detects the PLCP preamble, thereby issuing a timing generation notification (PMD_DATA.ind (preamble Detect)) to the PLCP unit 350. Accordingly, the PLCP unit 350 is notified of the timing of the termination end of the PLCP preamble detected by the PMD unit 340.

Subsequently, the PLCL unit 350 detects that the received packet signal is the Ack frame 200 on the basis of the packet signal reception end notification and the timing generation notification that have been issued by the PMD unit 340. Accordingly, the PLCP unit 350 issues an Ack detection result thereof (PHY_RXEND.req (Ack Find)) to the MAC unit 360. Then, the MAC unit 360 changes from a waiting status to a reception status for the Ack frame 200.

In this way, the Ack frame is not detected by the MAC unit 360, but the Ack frame 200 can be detected by the PLCP unit 350, so that the power consumption of the reception apparatus 300 can be reduced.

[Specific Example Configuration of Reception Apparatus]

Figure 10:
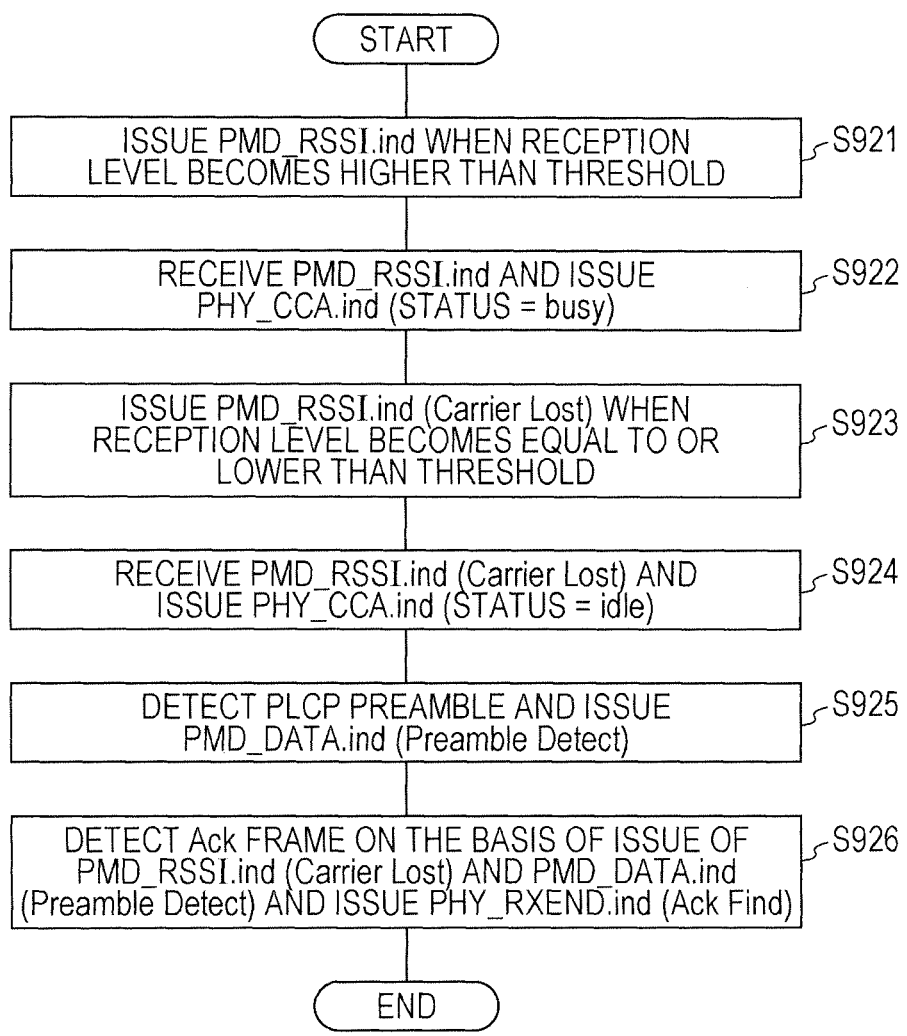
FIG. 10 is a flowchart illustrating an example procedure of a process of receiving the Ack frame 200 in the reception apparatus 300 according to the first embodiment of the present invention.

FIG. 10 is a flowchart illustrating an example procedure of a process of receiving the Ack frame 200 performed by the reception apparatus 300 according to the first embodiment of the present invention.

First, when the signal strength supplied from the RF unit 320 becomes higher than a certain threshold, the PMD unit 340 issues a packet signal reception start notification (PMD_RSSI.ind) to the PLCP unit 350 (step S921). Then, the PLCP unit 350 issues a reception start notification (PHY_CCA.ind (STATUS=busy)) to the MAC unit 360 (step S922).

Subsequently, when the signal strength of the packet signal becomes equal to or lower than the certain threshold, the PMD unit 340 issues a packet signal reception end notification (PMD_RSSI.ind (Carrier Lost)) to the PLCP unit 350 (step S923). Then, the PLCP unit 350 issues a reception end notification (PHY_CCA.ind (STATUS=idle)) to the MAC unit 360 (step S924). Also, the PMD unit 340 detects the PLCP preamble, thereby issuing a timing generation notification (PMD_DATA.ind (preamble Detect)) to the PLCP unit 350 (step S925).

Subsequently, the PLCL unit 350 detects the Ack frame 200 on the basis of the packet signal reception end notification and the timing generation notification. Then, after the Ack frame 200 has been detected, an Ack detection result (PHY_RXEND.req (Ack Find)) is issued (step S926).

Figure 11:
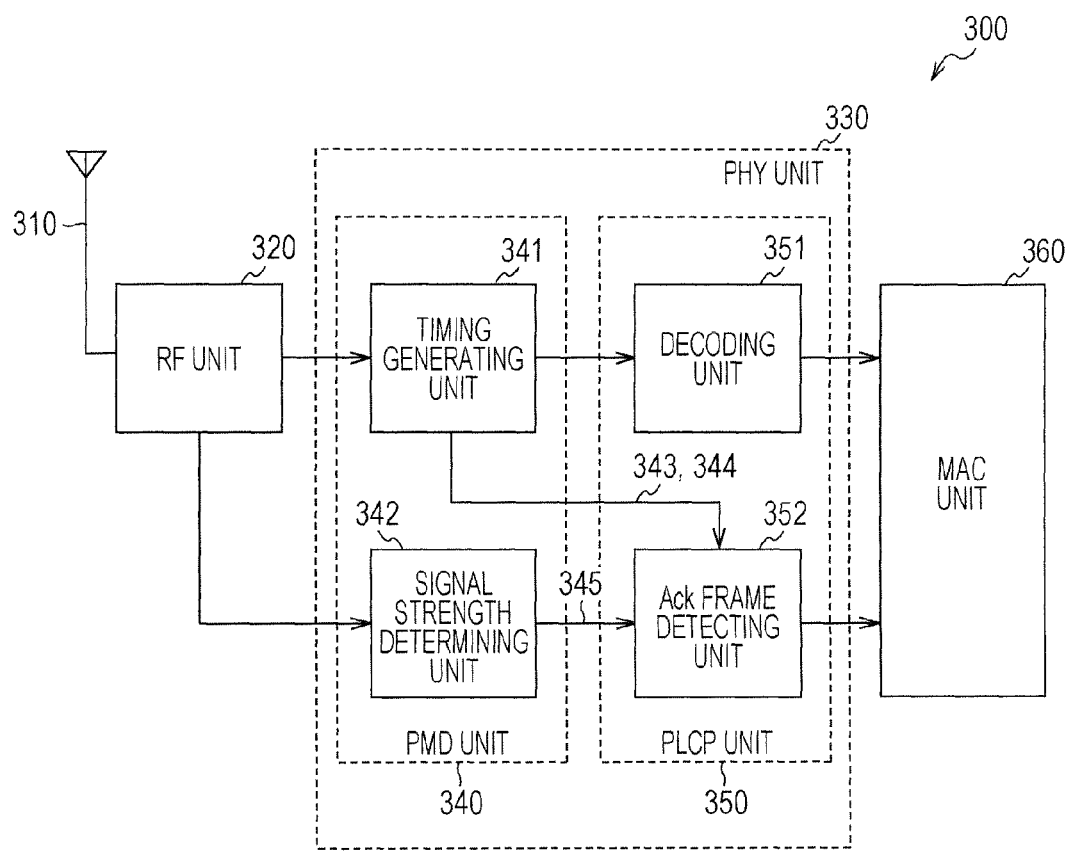
FIG. 11 is a block diagram illustrating an example functional configuration of a PMD unit 340 and a PLCP unit 350 in the reception apparatus 300 according to the first embodiment of the present invention.

FIG. 11 is a block diagram illustrating an example functional configuration of the PMD unit 340 and the PLCP unit 350 in the reception apparatus 300 according to the first embodiment of the present invention. Here, the configuration of the parts other than the PMD unit 340 and the PLCP unit 350 is the same as that illustrated in FIG. 1, and thus the same reference numerals as those in FIG. 1 are attached and the description thereof is omitted here.

The PMD unit 340 includes a timing generating unit 341 and a signal strength determining unit 342. Also, the PLCP unit 350 includes a decoding unit 351 and an Ack frame detecting unit 352.

The timing generating unit 341 detects a PLCP preamble included in a frame supplied from the RF unit 320, thereby generating the timing of the termination end of the preamble. The timing generating unit 341 supplies the generated timing of the termination end of the preamble to the Ack frame detecting unit 352. Also, for example, the timing generating unit 341 detects the PLCP preamble, thereby performing signal amplification and adjustment of carrier frequency error on the received frame. Then, the timing generating unit 341 supplies, to the decoding unit 351, the frame on which signal amplification and adjustment of carrier frequency error have been performed. Note that the timing generating unit 341 is an example of the timing generating unit described in the claims.

The signal strength determining unit 342 determines the start end and termination end of a packet signal on the basis of the signal strength of the packet signal supplied from the RF unit 320. The signal strength determining unit 342 determines the termination end of the packet signal on the basis of the signal strength and a certain threshold. The signal strength determining unit 342 notifies the Ack frame detecting unit 352 of the result in which the start end and termination end of the packet signal have been determined. Note that the signal strength determining unit 342 is an example of the signal strength determining unit described in the claims.

The decoding unit 351 decodes the frame supplied from the timing generating unit 341. The decoding unit 351 supplies the decoded frame, serving as reception data, to the MAC unit 360. Then, the MAC unit 360 detects, for example, that the decoded data is a conventional Ack frame representing an acknowledgement. Note that the decoding unit 351 and the MAC unit 360 are examples of the decoding unit and the acknowledgement data detecting unit described in the claims.

The Ack frame detecting unit 352 detects the Ack frame 200 on the basis of the timing of the termination end of the PLCP preamble generated by the timing generating unit 341 and the result in which the termination end of the packet signal has been determined by the signal strength determining unit 342. If the Ack frame 200 has been detected, the Ack frame detecting unit 352 notifies the MAC unit 360 of the detection result. Note that the Ack frame detecting unit 352 is an example of the acknowledgement frame detecting unit described in the claims.

[Example Functional Configuration of Ack Frame Detecting Unit]

Figure 12:
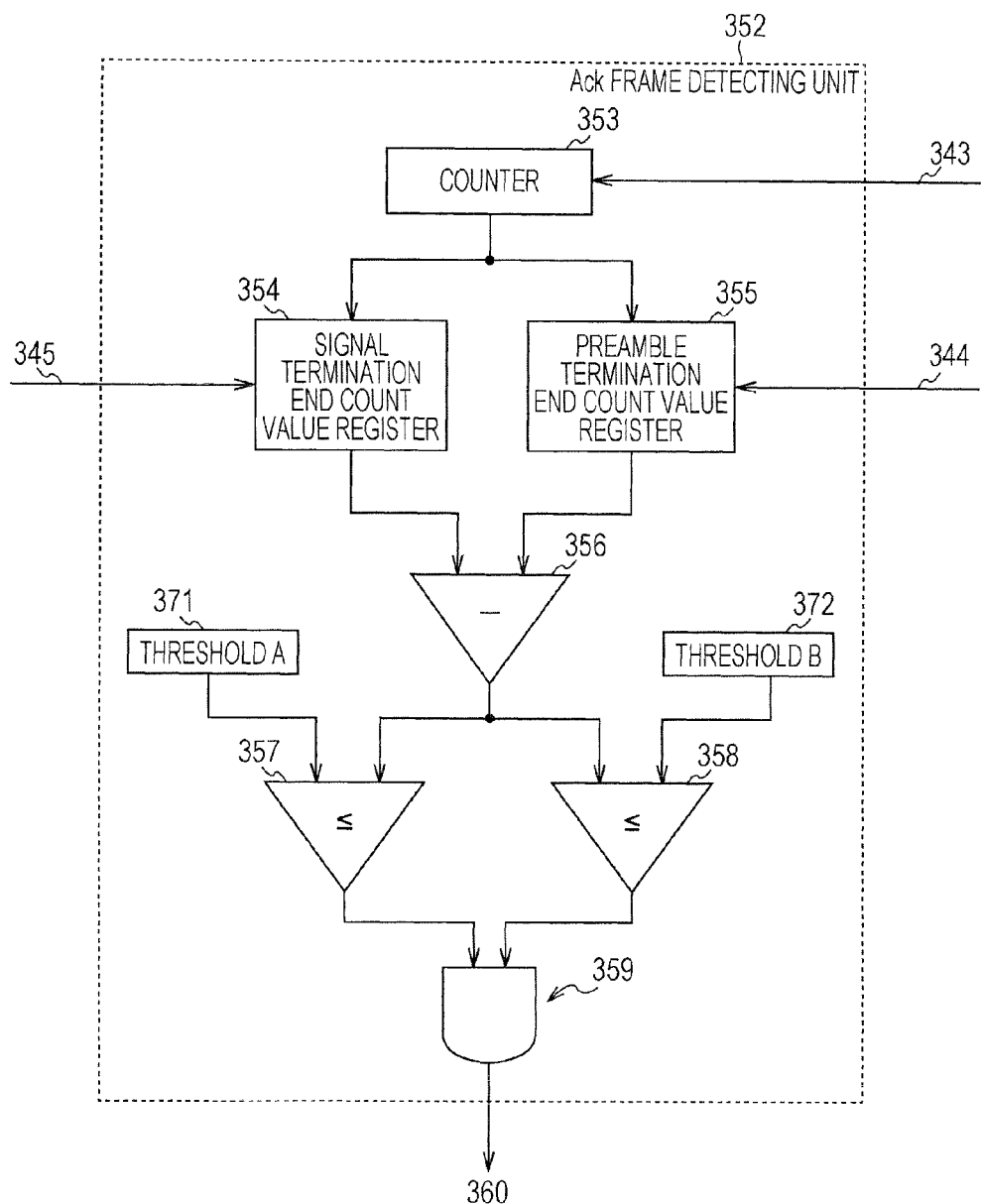
FIG. 12 is a block diagram illustrating an example functional configuration of an Ack frame detecting unit 352 according to the first embodiment of the present invention.

FIG. 12 is a block diagram illustrating an example functional configuration of the Ack frame detecting unit 352 according to the first embodiment of the present invention.

The Ack frame detecting unit 352 includes a counter 353, a signal termination end count value register 354, a preamble termination end count value register 355, a subtracter 356, comparators 357 and 358, an AND circuit 359, and threshold holding units 371 and 372.

The counter 353 starts counting on the basis of a counter activation request supplied from the timing generating unit 341 through a signal line 343. The counter 353 supplies the started count value to the signal termination end count value register 354 and the preamble termination end count value register 355. Also, the counter 353 stops counting on the basis of a counter stop request supplied from the timing generating unit 341 through the signal line 343.

The signal termination end count value register 354 holds the count value of the counter 353 on the basis of a notification that is made at the determination of the termination end of the packet signal and that is supplied from the signal strength determining unit 342 through a signal line 345. The signal termination end count value register 354 supplies the count value held therein to the subtracter 356.

The preamble termination end count value register 355 holds the count value of the counter 353 on the basis of the timing supplied from the timing generating unit 341 through a signal line 344. The preamble termination end count value register 355 supplies the count value held therein to the subtracter 356.

The subtracter 356 performs subtraction on both the count values held in the signal termination end count value register 354 and the preamble termination end count value register 355. That is, the subtracter 356 subtracts the count value held in the signal termination end count value register 354 from the count value held in the preamble termination end count value register 355, thereby calculating the difference between the count values. The subtracter 356 supplies the difference between the count values to the comparators 357 and 358.

The threshold holding units 371 and 372 hold thresholds that are preset for detecting the Ack frame 200. Here, it is assumed that a threshold B is larger than a threshold A. Also, the threshold holding unit 371 supplies the threshold A held therein to the comparator 357. The threshold holding unit 372 supplies the threshold B held therein to the comparator 358. An example of setting these thresholds A and B will be described below with reference to the next figure.

The comparator 357 compares the threshold A held in the threshold holding unit 371 with the difference between the count values supplied from the subtracter 356. If the difference between the count values supplied from the subtracter 356 is equal to or larger than the threshold A, the comparator 357 supplies "1" to the AND circuit 359. If the difference is smaller than the threshold A, the comparator 357 supplies "0" to the AND circuit 359.

The comparator 358 compares the threshold B held in the threshold holding unit 372 with the difference between the count values supplied from the subtracter 356. If the difference between the count values supplied from the subtracter 356 is larger than the threshold B, the comparator 358 supplies "0" to the AND circuit 359. If the difference is equal to or smaller than the threshold B, the comparator 358 supplies "1" to the AND circuit 359.

The AND circuit 359 performs an AND operation on the basis of the signals supplied from the comparators 357 and 358. The AND circuit 359 supplies "1" to the MAC unit 360 only in a case where the signal supplied from the comparator 357 is "1" and the signal supplied from the comparator 358 is "1". That is, the AND circuit 359 supplies "1" representing the Ack frame 200 to the MAC unit 360 in a case where the difference between the count values is equal to or larger than the threshold A and is equal to or smaller than the threshold B. Otherwise, the AND circuit 359 supplies "0" representing a frame other than the Ack frame to the MAC unit 360.

In this way, the Ack frame 200 is detected on the basis of the timing of the termination end of the PLCP preamble supplied from the timing generating unit 341 and the result in which the termination end of the packet signal has been determined by the signal strength determining unit 342. Also, the Ack frame 200 can be accurately detected by making the difference between the threshold A and the threshold B small. Next, a method for detecting the Ack frame 200 by the Ack frame detecting unit 352 will be described in detail with reference to the next figure.

[Example of Detecting Ack Frame]

Figure 13:
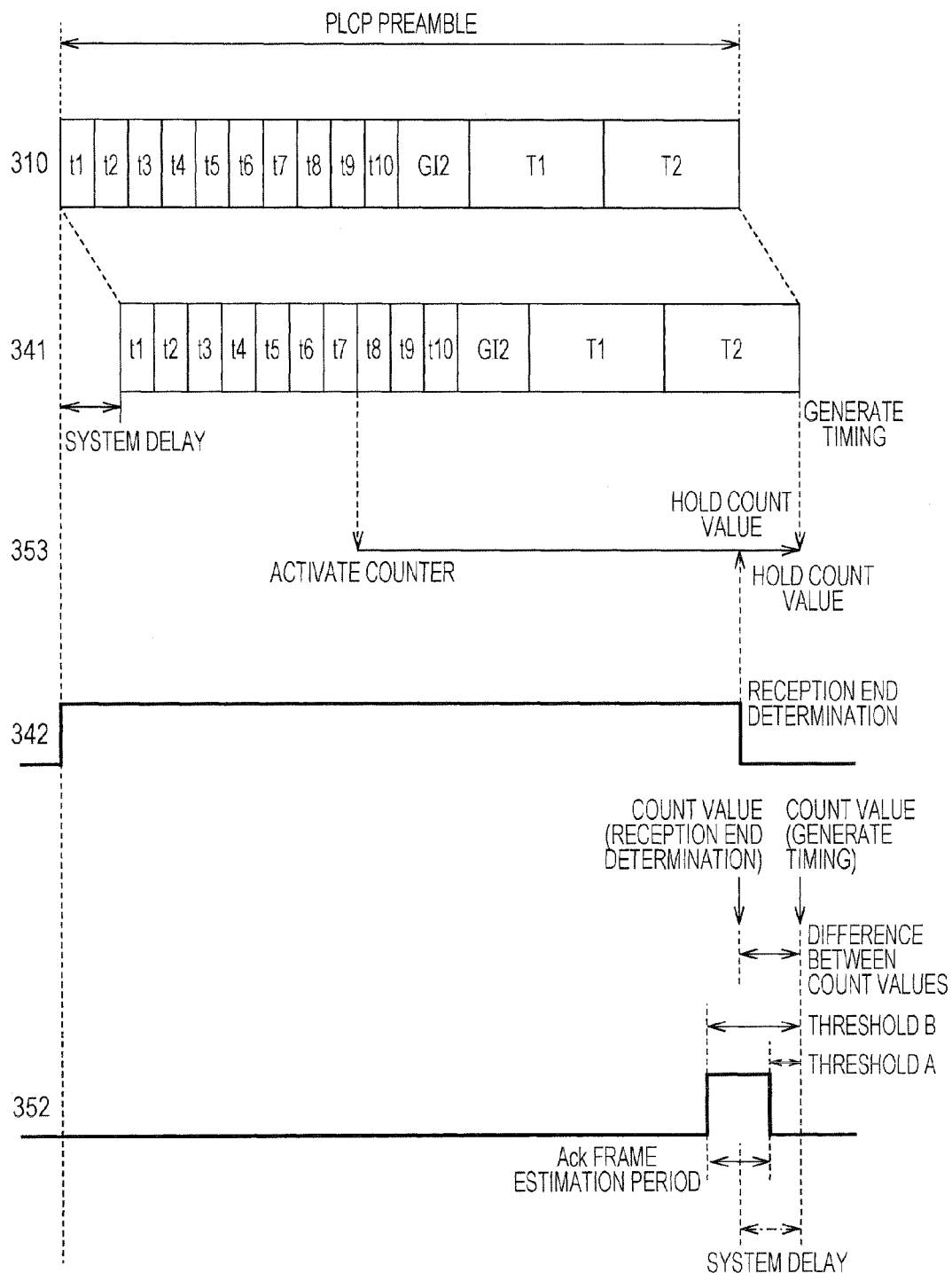
FIG. 13 is an idea diagram illustrating an example of a method for detecting the Ack frame 200 by the Ack frame detecting unit 352 according to the first embodiment of the present invention.

FIG. 13 is an idea diagram illustrating an example of a method for detecting the Ack frame 200 by the Ack frame detecting unit 352 according to the first embodiment of the present invention. Here, a PLCP preamble received by the antenna 310 and a PLCP preamble supplied to the timing generating unit 341 are illustrated, with the horizontal axis being a time axis. Furthermore, the timing of holding the count value of the counter 353 included in the Ack frame detecting unit 352 and the signal strength in the signal strength determining unit 342 are illustrated.

Here, it is assumed that the PLCP preamble in the timing generating unit 341 is transmitted with delay compared to the PLCP preamble in the antenna 310 due to system delay that is caused by passage through a filter or the like. Also, it is assumed that the signal strength of the packet signal in the antenna 310 is supplied to the signal strength determining unit 342 without delay for easy understanding.

First, when the Ack frame 200 is received, the timing generating unit 341 transmits an activation request to the counter 353 in the Ack frame detecting unit 352. For example, the timing generating unit 341 transmits the activation request at the timing of the termination end of a short training symbol t7 among short training symbols t1 to t10 in the PLCP preamble. Accordingly, the counter 353 starts counting. After that, when the signal strength becomes equal to or lower than a threshold, the signal strength determining unit 342 determines the termination end of the Ack frame 200 (reception end determination). Then, the signal strength determining unit 342 notifies the signal termination end count value register 354 in the Ack frame detecting unit 352 of the determination result. On the basis of the notification, the signal termination end count value register 354 holds the count value of the counter 353.

Next, the timing generating unit 341 detects the PLCP preamble, thereby generating the timing of the termination end of the PLCP preamble. Then, the timing generating unit 341 notifies the preamble termination end count value register 355 in the Ack frame detecting unit 352 of the generated timing. On the basis of the notification of the timing generation, the preamble termination end count value register 355 holds the count value of the counter 353. Also, the timing generating unit 341 transmits a stop request for stopping the counter 353. Then, the counter 353 stops counting.

Subsequently, the Ack frame detecting unit 352 detects the Ack frame 200 on the basis of the count value that is held in accordance with the notification of the determination result from the signal strength determining unit 342 and the count value that is held at the timing generated by the timing generating unit 341. That is, the Ack frame detecting unit 352 detects the Ack frame 200 by determining whether or not notification of the reception end determination from the signal strength determining unit 342 is performed within an Ack frame estimation period. This Ack frame estimation period is set in view of system delay, determination error caused by the signal strength determining unit 342, detection error caused by the timing generating unit 341, etc. on the basis of the timing generated by the timing generating unit 341. That is, this Ack frame estimation period is set in accordance with the threshold A and the threshold B with reference to the termination end of the PLCP preamble generated by the timing generating unit 341.

In this example, the Ack frame detecting unit 352 calculates the difference between the count value that is held in accordance with notification of a determination result from the signal strength determining unit 342 and the count value that is held at the timing of generation performed by the timing generating unit 341. Then, the Ack frame detecting unit 352 detects that the packet signal received by the antenna 310 is the Ack frame 200 because the difference between the count values is equal to or larger than the threshold A and is equal to or smaller than the threshold B.

In this way, the Ack frame detecting unit 352 estimates the period in which notification of the result of the reception end determination made by the signal strength determining unit 342 is performed on the basis of the timing of the termination end of the PLCP preamble. Then, the Ack frame detecting unit 352 can detect that the packet signal is the Ack frame 200 on the basis of the estimated period and the result of the determination made by the signal strength determining unit 342. That is, the Ack frame detecting unit 352 can detect that the received packet signal is the Ack frame 200 on the basis of the difference between the count values, the threshold A, and the threshold B.

[Example of Determining Termination End of Ack Frame]

Figure 14:
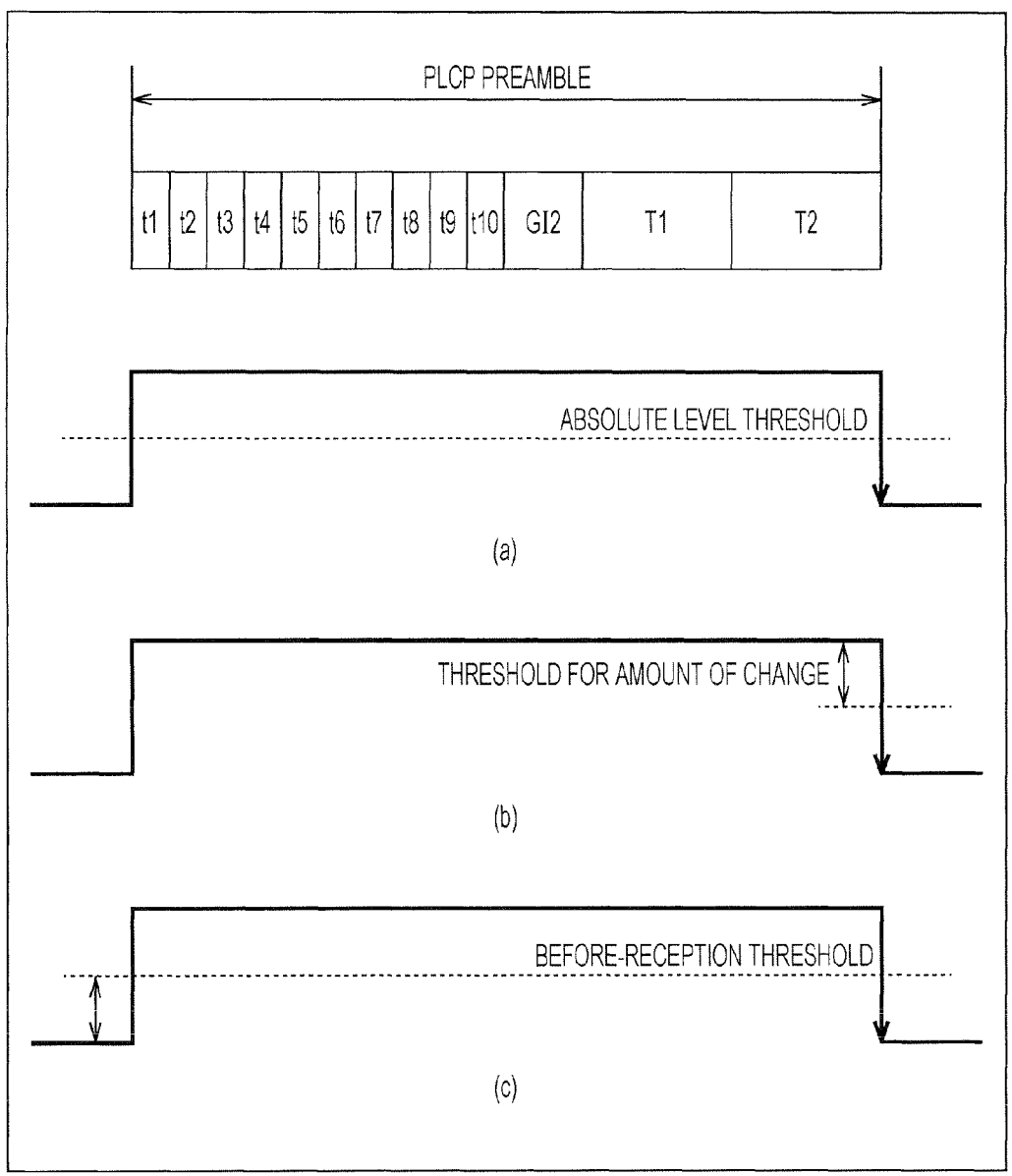
FIG. 14 is a diagram illustrating an example of a method for determining a termination end of a packet signal by a signal strength determining unit 342 according to the first embodiment of the present invention.

FIG. 14 is a diagram illustrating an example of a method for determining the termination end of a packet signal by the signal strength determining unit 342 according to the first embodiment of the present invention. Parts (a) to (c) of FIG. 14 illustrate change of the signal strength supplied from the RF unit 320 in a case where the Ack frame 200 made up of only a PLCP preamble is received, with the horizontal axis being a time axis.

In part (a) of FIG. 14, the signal strength determining unit 342 determines the termination end of a packet signal on the basis of the signal strength supplied from the RF unit 320 with reference to an absolute level threshold, which is a predetermined threshold of an absolute value. In part (b) of FIG. 14, the signal strength determining unit 342 determines the termination end of a packet signal on the basis of the amount of change in the signal strength supplied from the RF unit 320 with reference to a predetermined threshold for the amount of change. In part (c) of FIG. 14, the signal strength determining unit 342 determines the termination end of a packet signal on the basis of the signal strength supplied from the RF unit 320 with reference to a before-reception threshold, which is a threshold calculated by adding a predetermined value to the signal strength before reception of the packet signal. Note that the signal strength determining unit 342 may determine the termination end of the packet signal by combining at least two methods among the above-described three determination methods illustrated in parts (a) to (c) of FIG. 14. For example, the signal strength determining unit 342 may determine the termination end of the packet signal when both the determination standards in parts (a) and (b) of FIG. 14 are satisfied.

Next, an acknowledgement operation of the reception apparatus 300 according to the first embodiment of the present invention will be described with reference to the drawings.

[Example of Acknowledgement Process of Reception Apparatus]

Figure 15:
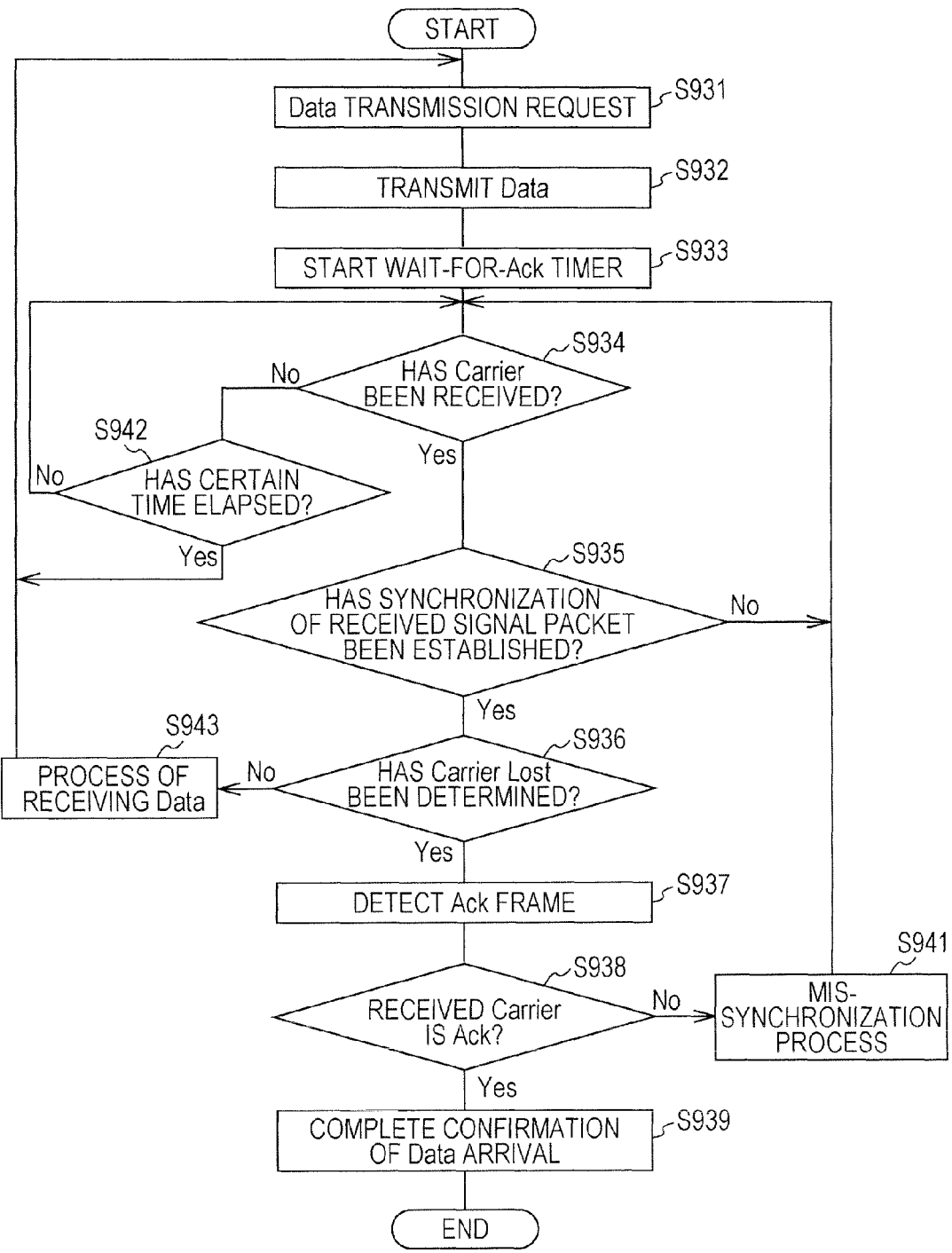
FIG. 15 is a flowchart illustrating an example procedure of an acknowledgement process of the reception apparatus 300 according to the first embodiment of the present invention.

FIG. 15 is a flowchart illustrating an example procedure of an acknowledgement process of the reception apparatus 300 according to the first embodiment of the present invention.

First the MAC unit 360 issues a transmission start request for transmitting a Data frame (step S931). Subsequently, the SHY unit 330 generates a Data frame, which is then transmitted to the transmission apparatus 100 via the antenna 310 (step S932). At that time, a wait-for-Ack timer for measuring a waiting time for the Ack frame 200 is started (step S933). Then, the signal strength determining unit 342 determines whether or not a packet signal has been received via the antenna 110 and the RF unit 120 (step S934). That is, the signal strength determining unit 342 determines whether or not the signal strength supplied from the RF unit 320 has exceeded a threshold. Note that step S934 is an example of the reception procedure and the signal strength determination procedure described in the claims.

Then, during a period until a packet signal is received, it is determined whether or not a certain time has elapsed in the wait-for-Ack timer (step S942). Then, if the certain time has not elapsed, the process returns to step S934. If the certain time has elapsed, the process returns to step S931, and a re-transmission process is performed.

On the other hand, if a packet signal has been received, the timing generating unit 341 determines whether or not the synchronization of the received packet signal has been established (step S935). Then, if the synchronization of the received packet signal has not been established, the process returns to step S934. On the other hand, if the synchronization of the received packet signal has been established, a preamble signal is detected, whereby the timing of the termination end of the PLCP preamble is generated. Note that step S935 is an example of the timing generation procedure described in the claims.

Subsequently, it is determined whether or not the end of the packet signal has been determined by the signal strength determining unit 342 (step S936). That is, it is determined whether or not the termination end of the packet signal has been determined by the signal strength determining unit 342 on the basis of the signal strength. Note that step S936 is an example of the signal strength determination procedure described in the claims. Then, if the termination end of the packet signal has not been detected, the packet signal is determined to be a Data frame, so that a process of receiving the Data frame is performed (step S943).

On the other hand, if the termination end of the packet signal has been detected, detection of the Ack frame 200 is performed (step S937). That is, it is detected whether or not the packet signal is the Ack frame 200 on the basis of the timing determined to be the termination end of the packet signal by the signal strength determining unit 342 and the timing of the termination end of the PLCP preamble generated by the timing generating unit. Note that step S937 is an example of the acknowledgement frame detection procedure described in the claims.

Subsequently, it is determined whether or not the packet signal is the Ack frame 200 (step S938). Then, if the packet signal is not the Ack frame 200, a mis-synchronization process is performed (step S941), and the process returns to step S934. On the other hand, if the packet signal is the Ack frame 200, the MAC unit 360 is notified that the Ack frame 200 has been detected. Accordingly, the MAC unit 360 recognizes that the data has been properly received by the transmission apparatus 100 (step S939).

As described above, according to the first embodiment of the present invention, the collision of an Ack frame and another frame due to the hidden terminal problem illustrated in FIG. 4 can be avoided by using the Ack frame 200. Furthermore, the throughput in the wireless communication system can be improved by using the Ack frame 200 with a short frame length.

Additionally, although the example of the wireless communication system using the Ack frame 200 has been described in the first embodiment of the present invention, the Ack frame 200 and the conventional Ack frame 601 may be used in combination.

2. Second Embodiment

[Example of Usage in Combination with Conventional Ack Frame]

Figure 16:
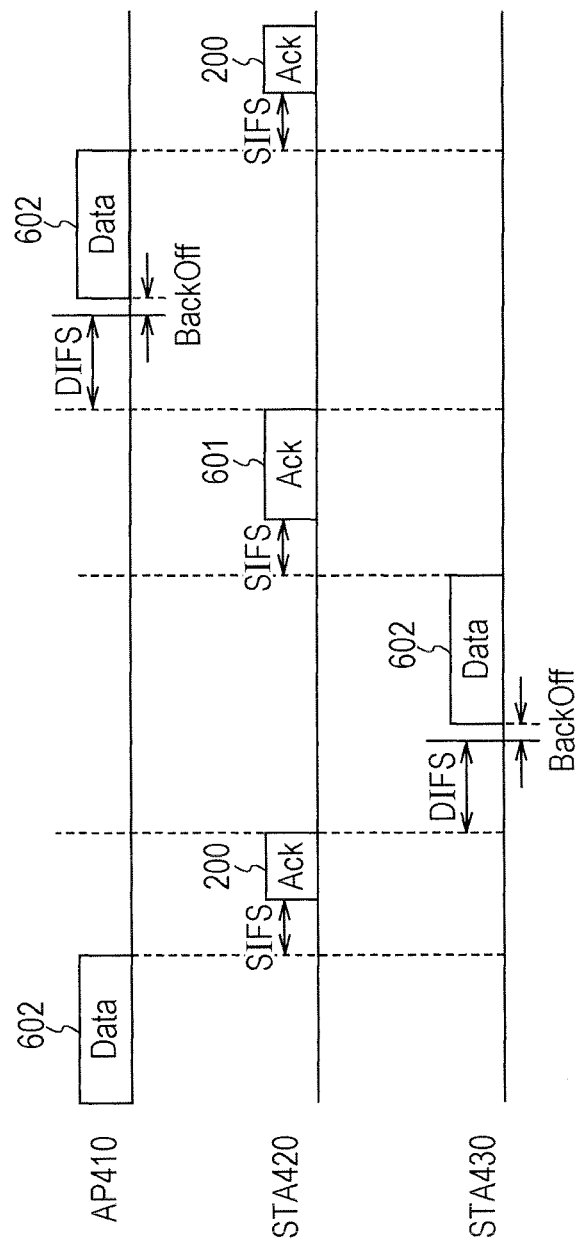
FIG. 16 is a diagram illustrating an example of a communication procedure in the case of using the Ack frame 200 and a conventional Ack frame 601 in combination according to a second embodiment of the present invention.

FIG. 16 is a diagram illustrating an example of a communication procedure in a case where the Ack frame 200 and the conventional Ack frame 601 are used in combination according to a second embodiment of the present invention. Here, it is assumed that the Ack frame 200 according to the first embodiment of the present invention is used in communication between the wireless base station (AP) 410 and the wireless terminal (STA) 420. Also, it is assumed that the conventional Ack frame 601 is used in communication between the wireless terminal (STA) 430 and the wireless terminal (STA) 420. Also, the frames transmitted from the wireless base station (AP) 410, the wireless terminal (STA) 420, and the wireless terminal (STA) 430 are illustrated, with the horizontal axis being a time axis.

In this example, the Data frame 602 is transmitted from the wireless base station (AP) 410, and the wireless terminal (STA) 420 that has received it transmits the Ack frame 200 after waiting SIFS. Subsequently, the wireless terminal (STA) 430 transmits the Data frame 602 to the wireless terminal (STA) 420 after DIFS and BackOff time have elapsed from the end of transmission of the Ack frame 200. In this case, the wireless terminal (STA) 420 that has received the Data frame 602 from the wireless terminal (STA) 430 transmits the conventional Ack frame 601 to the wireless terminal (STA) 430.

Subsequently, the wireless base station (AP) 410 transmits the Data frame 602 to the wireless terminal (STA) 420 after DIFS and BackOff time have elapsed from the end of transmission of the conventional Ack frame 601. Then, the wireless terminal (STA) 420 that has received the Data frame 602 from the wireless base station (AP) 410 transmits the Ack frame 200 to the wireless base station (AP) 410.

As described above, according to the second embodiment of the present invention, the Ack frame 200 and the conventional Ack frame 601 can be used in combination, because the first embodiment of the present invention is an improvement based on the configuration of the conventional wireless communication system.

Note that, in the embodiments of the present invention, a description has been given of an example of applying a PLCP preamble based on the IEEE802.11a standard as an example of the Ack frame 200 made up of only a preamble, but the present invention is not limited thereto. For example, a PLCP preamble based on the IEEE802.11b/11g standard or the like may be applied.

Note that the embodiments of the present invention form an example for embodying the present invention, and have the correspondence with the respective elements of the invention described in the claims, as described above. However, the present invention is not limited to the embodiments, and various modifications are acceptable without deviating from the scope of the present invention.

Also, the process procedures described in the embodiments of the present invention may be regarded as a method including the series of procedures, or may be regarded as a program causing a computer to execute the series of procedures and a recording medium storing the program. As the recording medium, a CD (Compact Disc), an MD (Mini Disc), a DVD (Digital Versatile Disk), a memory card, a Blu-ray Disc (registered trademark), or the like may be used, for example.

REFERENCE SIGNS LIST 100 transmission apparatus
110, 310 antenna
120, 320 RF unit
130, 330 PHY unit
140, 340 PMD unit
150, 350 PLCP unit
160, 360 MAC unit
300 reception apparatus
341 timing generating unit
342 signal strength determining unit
351 decoding unit
352 Ack frame detecting unit
353 counter
354 signal termination end count value register
355 preamble termination end count value register
356 subtracter
357, 358 comparator
359 AND circuit
371, 372 threshold holding unit

The invention claimed is:

1. A communication apparatus comprising:
a preamble generating unit operable to generate a packet signal comprising a preamble for adjusting carrier frequency error of a high-frequency signal; and
a transmitting unit operable to transmit the generated packet signal as the high-frequency signal to a receiving apparatus, wherein the receiving apparatus detects that the received packet signal is an acknowledgement frame if a timing of termination end of the received packet signal is less than a timing of termination end of the preamble.

2. A reception apparatus comprising:
a receiving unit operable to receive a packet signal comprising a preamble;
a signal strength determining unit operable to determine a timing of termination end of the packet signal on the basis of a signal strength of the packet signal received by the receiving unit;
a timing generating unit operable to detect the preamble from the received packet signal and generate a timing of termination end of the detected preamble; and
an acknowledgement frame detecting unit operable to detect that the received packet signal is an acknowledgement frame if the timing of the termination end of the received packet signal is less than the timing of the termination end of the detected preamble.

3. The reception apparatus according to claim 2, wherein the acknowledgement frame detecting unit is operable to detect that the received packet signal is the acknowledgement frame on the basis of an estimated period and the timing of the termination end of the received packet signal, wherein the estimated period is a period in which the signal strength determining unit determines the timing of the termination end of the received packet signal on the basis of the timing of the termination end of the detected preamble.

4. The reception apparatus according to claim 2, further comprising:
a decoding unit operable to decode the packet signal received by the receiving unit; and
an acknowledgement data detecting unit operable to detect that data decoded by the decoding unit is the data representing an acknowledgement.

5. The reception apparatus according to claim 2, wherein the signal strength determining unit is operable to determine the timing of the termination end of the received packet signal on the basis of the signal strength of the packet signal received by the receiving unit and a certain threshold.

6. The reception apparatus according to claim 5, wherein the signal strength determining unit is operable to determine the timing of the termination end of the received packet signal on the basis of an amount of change in the signal strength of the packet signal received by the receiving unit.

7. The reception apparatus according to claim 5, wherein the signal strength determining unit is operable to set the threshold on the basis of the signal strength of the packet signal before the packet signal is received by the receiving unit.

8. A communication system comprising:
a transmission apparatus operable to transmit a packet signal comprising a preamble; and
a reception apparatus that comprises:
a receiving unit operable to receive the packet signal transmitted from the transmission apparatus;
a signal strength determining unit operable to determine a timing of termination end of the received packet signal on the basis of a signal strength of the packet signal received by the receiving unit;
a timing generating unit operable to detect the preamble from the received packet signal and generate a timing of termination end of the detected preamble; and
an acknowledgement frame detecting unit operable to detect that the received packet signal is an acknowledgement frame if the timing of the termination end of the received packet signal is less than the timing of the termination end of the detected preamble.

9. An acknowledgement frame detection method comprising:
receiving a packet signal comprising a preamble;
determining a timing of termination end of the received packet signal on the basis of a signal strength of the received packet signal;
detecting the preamble from the received packet signal;
generating a timing of termination end of the detected preamble; and
detecting that the received packet signal is an acknowledgement frame if the timing of the termination end of the received packet signal is less than the timing of the termination end of the detected preamble.

10. The acknowledgement frame detection method according to claim 9, further comprising:

determining difference information by subtracting the timing of the termination end of the received packet signal from the timing of the termination end of the detected preamble; and comparing the determined difference information with a first timing threshold and a second timing threshold for the detection of the acknowledgement frame, wherein the received packet signal is detected as the acknowledgment frame, if the difference information is larger than the first timing threshold and is lesser than the second timing threshold.

11. The communication apparatus according to claim 1, wherein the preamble generating unit comprises a Physical Layer Convergence Protocol (PLCP) unit and a Physical Medium Dependent (PMD) unit.

12. The communication apparatus according to claim 11, wherein the PLCP unit is operable to generate the preamble and the PMD unit is operable to set a transmission level for the transmitting unit to transmit the preamble.

13. The communication apparatus according to claim 1, wherein the transmitting unit is operable to transmit the high-frequency signal in a frequency band of one of: 2.4 GHz band or a 5.2 GHz band.

14. The reception apparatus according to claim 2, wherein the received packet signal is detected as the acknowledgement frame when the timing of the termination end of the received packet signal is within a period defined by a first timing threshold and a second timing threshold.

15. The reception apparatus according to claim 14, wherein the second timing threshold is larger than the first timing threshold.

16. The reception apparatus according to claim 2, wherein the acknowledgement frame detecting unit is operable to:
determine difference information by subtracting the timing of the termination end of the received packet signal from the timing of the termination end of the detected preamble; and
compare the determined difference information with a first timing threshold and a second timing threshold for the detection of the acknowledgement frame.

17. The reception apparatus according to claim 16, wherein the received packet signal is detected as the acknowledgment frame, if the determined difference information is larger than the first timing threshold and is lesser than the second timing threshold.

18. The reception apparatus according to claim 2, wherein the preamble comprises a plurality of short training symbols and a plurality of long training symbols.

19. The reception apparatus according to claim 2, wherein the timing generating unit is operable to perform amplification of the received packet signal and adjust carrier frequency error in the received packet signal.

20. The reception apparatus according to claim 2, wherein the received packet signal is detected as a data frame if the timing of the termination end of the received packet signal is not determined by the signal strength determining unit.

* * * * *